United States Patent
Wong et al.

(10) Patent No.: US 12,552,513 B2
(45) Date of Patent: Feb. 17, 2026

(54) SYSTEM FOR CONTROLLING A MARINE VESSEL USING A SINGLE OPERATOR COMMAND

(71) Applicant: Dometic Marine Canada Inc., Richmond (CA)

(72) Inventors: Ray Wong, Richmond (CA); Davor Baros, Vancouver (CA); Dave Higgs, Vancouver (CA); Anson Chin Pang Chan, Richmond (CA)

(73) Assignee: Dometic Marine Canada Inc., Richmond (CA)

( * ) Notice: Subject to any disclaimer, the term of this patent is extended or adjusted under 35 U.S.C. 154(b) by 242 days.

(21) Appl. No.: 18/204,549

(22) Filed: Jun. 1, 2023

(65) Prior Publication Data
US 2023/0303235 A1  Sep. 28, 2023

Related U.S. Application Data

(63) Continuation of application No. 16/590,369, filed on Oct. 1, 2019, now Pat. No. 11,679,853.
(Continued)

(51) Int. Cl.
*B63H 25/44* (2006.01)
*B63B 39/14* (2006.01)
(Continued)

(52) U.S. Cl.
CPC ............. *B63H 25/44* (2013.01); *B63B 39/14* (2013.01); *B63B 49/00* (2013.01); *B63H 20/06* (2013.01);
(Continued)

(58) Field of Classification Search
CPC ........ B63H 25/44; B63H 25/02; B63H 20/06; B63H 20/106; B63H 20/12; B63H 2025/026; B63B 39/14; B63B 49/00
See application file for complete search history.

(56) References Cited

U.S. PATENT DOCUMENTS

| | | | |
|---|---|---|---|
| 5,263,432 | A | 11/1993 | Davis |
| 5,385,110 | A | 1/1995 | Bennett et al. |

(Continued)

FOREIGN PATENT DOCUMENTS

| | | |
|---|---|---|
| JP | S6444396 A | 2/1989 |
| JP | 2858133 B2 | 2/1999 |
| WO | 2013123208 A1 | 8/2013 |

OTHER PUBLICATIONS

European Patent Office, Extended European Search Report mailed Aug. 26, 2022 from corresponding European Patent Application No. 19869718.7; 7 pages.
(Continued)

*Primary Examiner* — Stephen P Avila
(74) *Attorney, Agent, or Firm* — CALDERON SAFRAN & WRIGHT P.C.

(57) ABSTRACT

A system for controlling a marine vessel comprises an input device for inputting an operator command, a sensor which senses and signals an engine function variable or a vessel dynamic variable, and a first structural element and a second structural element. The first structural element and the second structural element each control speed or direction of motion of the marine vessel, and the first structural element and the second structural element each affect the marine vessel dynamic variable. There is a controller which receives the operator command and the engine function variable or the vessel dynamic variable. The controller moves the first structural element and the second structural element based on the engine function variable or the vessel dynamic variable, after receiving the single operator command.

20 Claims, 19 Drawing Sheets

Related U.S. Application Data

(60) Provisional application No. 62/739,816, filed on Oct. 1, 2018.

(51) Int. Cl.
  *B63B 49/00* (2006.01)
  *B63H 20/06* (2006.01)
  *B63H 20/10* (2006.01)
  *B63H 20/12* (2006.01)
  *B63H 25/02* (2006.01)

(52) U.S. Cl.
  CPC .......... *B63H 20/106* (2013.01); *B63H 20/12* (2013.01); *B63H 25/02* (2013.01); *B63H 2025/026* (2013.01)

(56) References Cited

U.S. PATENT DOCUMENTS

| | | |
|---|---|---|
| D362,841 S | 10/1995 | Roza |
| 5,474,012 A | 12/1995 | Yamada |
| 6,041,730 A | 3/2000 | Oliverio |
| 6,354,237 B1 | 3/2002 | Gaynor et al. |
| 6,417,469 B1 | 7/2002 | Tamura |
| 6,659,816 B2 | 12/2003 | Fuse |
| 6,874,441 B2 | 4/2005 | Pigeon |
| D507,543 S | 7/2005 | Ishii et al. |
| 7,278,367 B1 | 10/2007 | Gonring et al. |
| 7,285,738 B2 | 10/2007 | Lavigne et al. |
| 7,479,607 B2 | 1/2009 | Sack et al. |
| 7,958,837 B1 | 6/2011 | Fraleigh |
| D654,880 S | 2/2012 | Lam |
| 8,261,682 B1 | 9/2012 | DeVito |
| 8,264,338 B2 | 9/2012 | Leon |
| 8,550,023 B1 | 10/2013 | Quail |
| D720,305 S | 12/2014 | Wenji |
| D725,050 S | 3/2015 | Tsugawa et al. |
| D725,612 S | 3/2015 | Schlegel et al. |
| 9,278,740 B1 | 3/2016 | Andrasko et al. |
| D758,325 S | 6/2016 | Cook et al. |
| D758,975 S | 6/2016 | Hunter et al. |
| 9,423,894 B2 | 8/2016 | Olsson et al. |
| 9,459,787 B2 | 10/2016 | Kulczycki et al. |
| 9,559,649 B2 | 1/2017 | Noh et al. |
| D782,987 S | 4/2017 | Gassner |
| 9,710,077 B2 | 7/2017 | Okazaki |
| D807,309 S | 1/2018 | Johnson et al. |
| 9,896,173 B2 | 2/2018 | Baros et al. |
| 9,911,556 B2 | 3/2018 | Lee et al. |
| D818,973 S | 5/2018 | Tang et al. |
| 10,000,268 B1 | 6/2018 | Poirier et al. |
| 10,040,522 B1 | 8/2018 | Hartman |
| 10,281,928 B2 | 5/2019 | Behling et al. |
| 10,358,189 B2 | 7/2019 | Sheedy et al. |
| D858,465 S | 9/2019 | Desbiens |
| 11,040,757 B2 | 6/2021 | Huyge et al. |
| 11,679,853 B2 | 6/2023 | Wong et al. |
| 2007/0238370 A1 | 10/2007 | Morvillo |
| 2011/0120364 A1* | 5/2011 | Mueller ................ B63H 25/42 114/285 |
| 2012/0103774 A1 | 5/2012 | Jun |
| 2012/0247934 A1 | 10/2012 | Schmidt et al. |
| 2013/0213293 A1 | 8/2013 | Gasper |
| 2014/0043303 A1 | 2/2014 | Baker et al. |
| 2014/0183011 A1 | 7/2014 | Park et al. |
| 2014/0277718 A1* | 9/2014 | Izhikevich ............... B25J 9/163 700/250 |
| 2014/0371912 A1* | 12/2014 | Passot .................... G06N 3/049 700/264 |
| 2016/0097393 A1 | 4/2016 | Hartman |
| 2017/0250037 A1 | 8/2017 | Tanaka et al. |
| 2017/0349257 A1 | 12/2017 | Hara et al. |
| 2021/0107617 A1 | 4/2021 | Nakatani |

OTHER PUBLICATIONS

Operatos Manual, Dynamic Trim Control System, Series S, downloaded from https://web.archive.org/web/20180819054339/http:/www.zipwake.com/media/27494/2011298-zipwake_series_s_operators_manual_en-r4a.pdf and dated Aug. 19, 2018 by web.archive.org.
Ownes Manual, downloaded from https://www.lencomarine.com/-/media/inriver/Trim_Tab_Manual_TCHDAT.pdf?modified=20200207110343 dated May 21, 2019.

* cited by examiner

SYSTEM FOR CONTROLLING A MARINE VESSEL USING A SINGLE OPERATOR COMMAND

CROSS-REFERENCE TO RELATED APPLICATIONS AND CLAIM TO PRIORITY

This application is a continuation of U.S. patent application Ser. No. 16/590,369, filed Oct. 1, 2019, which claims priority to U.S. Provisional Patent Application No. 62/739,816, filed Oct. 1, 2018. All applications in this paragraph are incorporated herein by reference in their entirety, for any purpose, and to which priority is claimed.

BACKGROUND OF THE INVENTION

Field of the Invention

The present invention relates to a system for controlling a marine vessel and, in particular, to a system for actuating a first structural element of a marine vessel and a second structural element of a marine vessel using a single operator command.

Description of the Related Art

United States Patent Application Publication No. 2007/0221113 which was published on Sep. 27, 2007, in the name of Detwiler et al. discloses a combined outboard motor support and trim plate. The combined outboard motor support and trim plate comprises a bracket assembly for attachment of an outboard motor to the transom of a marine vessel. The bracket assembly comprises right and left members and at least one cross member rigidly connected to both of said right and left members of the bracket assembly and extending from one of said members to the other. A trim plate is pivoted to the bracket assembly about a horizontal pivot axis. The trim plate is located below, and spaced from, said cross member, and pivotally movable about said pivot axis through a range of attitudes. An actuator is connected to the trim plate and the cross member, for controlling the attitude of the trim plate independently of the height of the outboard motor.

U.S. Pat. No. 9,896,173 which issued on Feb. 20, 2018, to Baros et al., discloses an apparatus for adjusting positions of an outboard propulsion unit of a marine vessel comprising a jack plate having a jack plate actuator capable of moving the propulsion unit between raised and lowered positions and a swivel bracket having a swivel bracket actuator capable of pivoting the propulsion unit between raised and lowered trim positions. There is a control system operatively connected to the jack plate actuator and the swivel bracket actuator. The control system includes a first manual control which incrementally moves the jack plate an incremental amount each time the first manual control is actuated and a second manual control which incrementally pivots the swivel bracket an incremental amount each time the second manual control is actuated. Movement of the propulsion unit within a tilt range may be detected and the jack plate may be moved to a preset position.

U.S. Pat. No. 8,261,682 which issued on Sep. 12, 2012, to DeVito discloses a boat trim tab system having an automatic controller for positioning trim tabs to perform user selected preset functions or maintain previously used positions in response to real time operating conditions. The system is intended to be a standalone system that is installed on a boat using a master control module to operate the trim tabs and a manual keypad to provide a user interface to the master control module. The system gathers real time data from a variety of onboard sources and uses the data to determine the optimal position of the trim tabs to enhance boat performance.

U.S. Pat. No. 9,334,022 which issued on May 10, 2016, to Gaspar et al. discloses an adjustable surf wake system which enhances a wake formed by a watercraft travelling through water. The system may include a flap for deflecting water traveling past the stern of the watercraft, and/or a positioner operably connected to the flap for positioning the flap relative to a longitudinal axis of the watercraft between a neutral position and an outward position. Positioning a port flap in its extended position enhances a starboard surf wake, and positioning the starboard flap in its extended position enhances a port surf wake.

SUMMARY OF THE INVENTION

It is an object of the present disclosure to provide a system for actuating a first structural element of a marine vessel and a second structural element of a marine vessel using a single operator command.

It is also an object of the present disclosure to provide a system for adjusting a steering position and/or trim of a propulsion unit of a marine vessel, and adjusting a position of another structural element which is used to control speed, direction of motion, and/or altitude of the marine vessel, using a single operator command. Said another structural element which controls speed, direction of motion, and/or altitude of the marine vessel may be a shallow water anchor, a trim tab, and/or wake gate.

There is accordingly provided a system for controlling a marine vessel comprising an input device for inputting an operator command, a sensor which senses and signals an engine function variable or a vessel dynamic variable, and a first structural element and a second structural element. The first structural element and the second structural element each control speed or direction of motion of the marine vessel, and the first structural element and the second structural element each affect the marine vessel dynamic variable. There is a controller which receives the operator command and the engine function variable or the marine vessel dynamic variable. The controller moves the first structural element and the second structural element based on the engine function variable or the marine vessel dynamic variable, after receiving the single operator command.

The engine function variable may be selected from the group engine function variables including an RPM command, an actual RPM, a throttle command, an actual throttle position, and fuel consumption. The vessel dynamic variable may be selected from the group of marine vessel dynamic variables including pitch angle, roll angle, heading, rate of change of heading, speedo and vertical movement. The first structural element and the second structural element are selected from the structural elements including a shallow water anchor, a jack plate, an engine trim actuator, a steering actuator, a trim tab, and a wake gate.

In a first embodiment, the system comprises a jack plate mounted on the transom of the marine vessel. The jack plate includes an actuator for raising and lowering the propulsion unit relative to the transom of the marine vessel. A shallow water anchor is mounted to the marine vessel. The shallow water anchor includes an actuator for moving the shallow water anchor between a deployed configuration and a retracted configuration. A controller controls the actuator for raising and lowering the propulsion unit and controls the actuator for moving the shallow water anchor between the deployed configuration and the retracted configuration. There is a sensor which senses and signals engine RPM or vessel speed to the controller. There is also an input device for inputting an operator command to the controller. Raising the propulsion unit and movement of the shallow water anchor from the deployed configuration to the retracted configuration occur when the operator command is entered and the engine RPM or vessel speed are below a threshold. There may be a swivel bracket pivotably coupled to the jack plate. The swivel bracket may support the propulsion unit. There may be an actuator for pivoting the swivel bracket relative to the jack plate. Pivoting of the swivel bracket relative to the jack plate may result in trimming of the propulsion unit. The controller may control the actuator for trimming the propulsion unit and the propulsion unit may be trimmed downwardly when the operator command is entered.

In a second embodiment, the system comprises a jack plate mounted on the transom of the marine vessel. The jack plate includes an actuator for raising and lowering the propulsion unit relative to the transom of the marine vessel. A trim tab is mounted on the transom of the marine vessel. The trim tab includes a trim plate and an actuator for deploying the trim tab by pivoting the trim plate relative to the transom of the marine vessel. A controller controls the actuator for raising and lowering the propulsion unit and controls the actuator for deploying the trim tab. There is a sensor which senses and signals engine RPM or vessel speed to the controller. There is also an input device for inputting an operator command to a controller. Raising and lowering of the propulsion unit and deployment of the trim tab occur simultaneously when the operator command is inputted and the engine RPM or vessel speed are below a threshold. There may be a swivel bracket pivotably coupled to the jack plate. The swivel bracket may support the propulsion unit. There may be an actuator for pivoting the swivel bracket relative to the jack plate. Pivoting of the swivel bracket relative to the jack plate may result in trimming of the propulsion unit. The controller may control the actuator for trimming the propulsion unit and the propulsion unit may be trimmed downwardly when the operator command is entered. There may be a shallow water anchor including an actuator for moving the shallow water anchor between a deployed configuration and a retracted configuration. Movement of the shallow water anchor from the deployed configuration to the retracted configuration may occur after the operator command is entered and the engine RPM or vessel speed are below a threshold.

In a third embodiment, the system comprises a port propulsion unit and a starboard propulsion unit mounted on a transom of the marine vessel. The system comprises a port jack plate mounted on the transom of the marine vessel and a starboard jack plate mounted on the transom of the marine vessel. The port jack plate supports the port propulsion unit and the port jack plate includes an actuator for raising and lowering the port propulsion unit relative to the transom of the marine vessel. The starboard jack plate supports the starboard propulsion unit and the starboard jack plate includes an actuator for raising and lowering the starboard propulsion unit relative to the transom of the marine vessel. A controller controls the actuator for raising and lowering the port propulsion unit and controls the actuator for raising and lowering the port propulsion unit. There is a sensor which senses and signals vessel heading to the controller. There is also a steering device for inputting a steering command to the controller to steer the port propulsion unit and the starboard propulsion unit. Steering of at least one of the port propulsion unit and the starboard propulsion unit and raising and lowering of at least one of the port propulsion unit and the starboard propulsion unit occur simultaneously when the steering command is inputted. There may a port trim tab mounted on the transom of the marine vessel and a starboard trim tab mounted on the transom of the marine vessel. At least one of the port trim tab and the starboard trim tab may be deployed when the steering command is inputted.

In a fourth example, the system comprises a propulsion unit and a wake gate. The propulsion unit includes a rudder and a drive shaft for moving the rudder to a desired position. The wake gate includes an actuator for moving the wake gate between a deployed configuration and a retracted configuration. A controller controls the drive shaft to move the rudder to the desired position and controls the actuator for moving the wake gate between the deployed configuration and the retracted configuration. There is a sensor which senses and signals vessel heading to the controller. There is also an input device for inputting an operator command to the controller to deploy the wake gate. The controller controls the drive shaft to move the rudder to the desired position, based on the vessel heading, when the operator command to the controller to deploy the wake gate is inputted.

In a fifth example, the system comprises a joystick for inputting an operator command to steer the marine vessel and an actuator for steering the marine vessel. A port trim tab and a starboard trim tab each mounted on a transom of the marine vessel. The port trim tab includes an actuator for deploying and retracting the port trim tab. The starboard trim tab includes an actuator for deploying and retracting the starboard trim tab. The controller receives the operator command. The controller controls the actuator for steering the marine vessel to steer the marine vessel, controls the actuator for deploying and retracting the port trim tab to retract the port trim tab, and controls the actuator for deploying and retracting the starboard trim tab to retract the starboard trim tab, when the operator command is received.

In a sixth embodiment, the system comprises an input device for inputting an operator command to reverse the marine vessel and an actuator for steering the marine vessel. A port trim tab and a starboard trim tab each mounted on a transom of the marine vessel. The port trim tab includes an actuator for deploying and retracting the port trim tab. The starboard trim tab includes an actuator for deploying and retracting the starboard trim tab. The controller receives the operator command. The controller controls the actuator for steering the marine vessel to steer the marine vessel, controls the actuator for deploying and retracting the port trim tab to retract the port trim tab, and controls the actuator for deploying and retracting the starboard trim tab to retract the starboard trim tab, when the operator command is received. The system may further include a steering rudder and a heading sensor for sensing and signalling a heading to the controller. The controller may controls a steering rudder angle based on the heading.

BRIEF DESCRIPTIONS OF DRAWINGS

The disclosure will be more readily understood from the following description of the embodiments thereof given, by way of example only, with reference to the accompanying drawings, in which.

DESCRIPTIONS OF THE PREFERRED EMBODIMENTS

Figure 1:
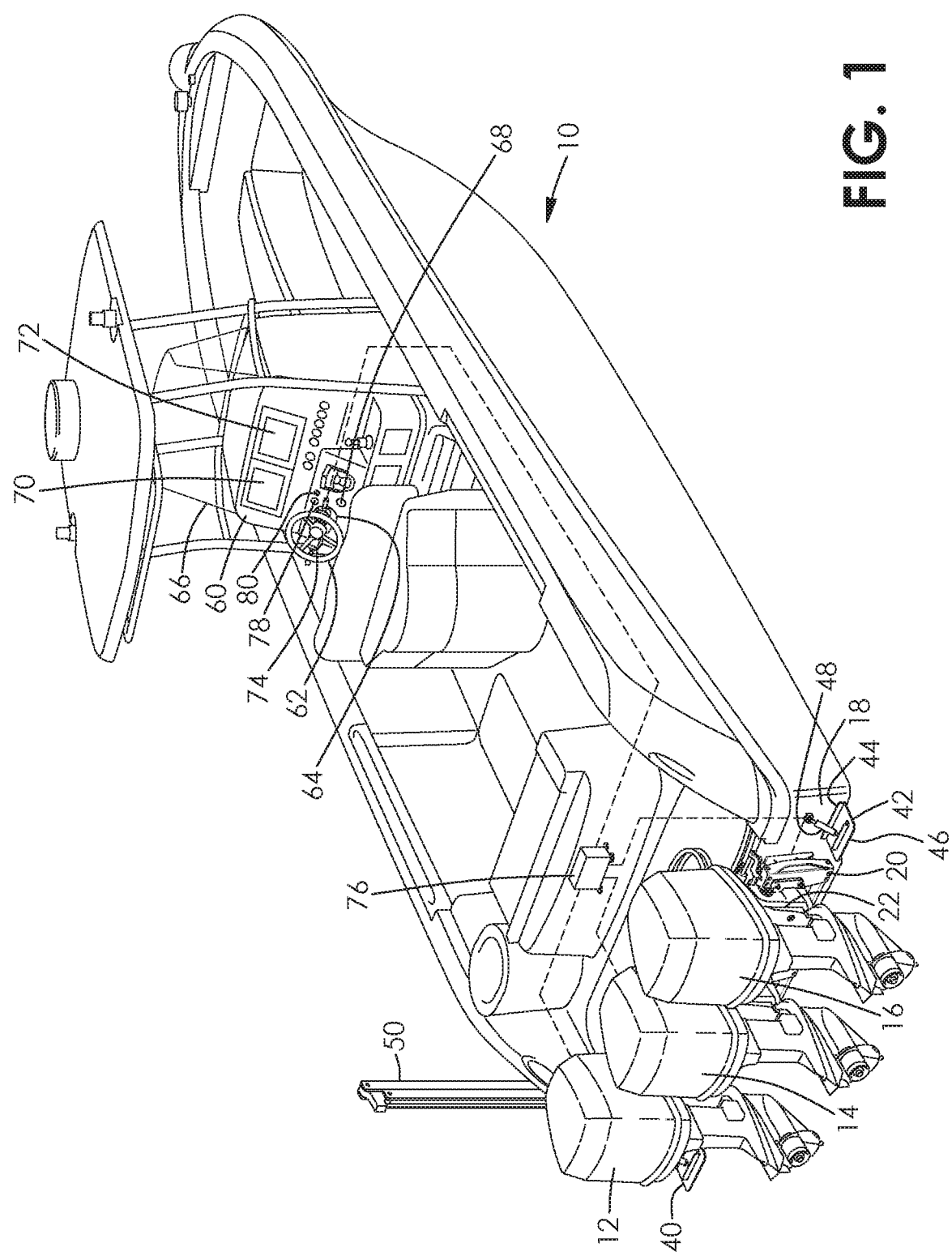
FIG. 1 is a perspective view of a marine vessel provided with a plurality of propulsion units mounted on a transom of the marine vessel with respective jack plates and swivel brackets.

Referring to the drawings and first to FIG. 1, there is shown a marine vessel 10 which is provided with a plurality of propulsion units which, in this example, are in the form of three outboard engines, namely, a port engine 12, a center engine 14, and a starboard engine 16. However, the propulsion units may be any number or form of propulsion units in other examples. The port engine 12, the center engine 14, and the starboard engine 16 are each mounted on a transom 18 of the marine vessel 10 by respective jack plates, for example, jack plate 20 as shown for the starboard engine 16. The port engine 12, the center engine 14, and the starboard engine 16 are each coupled to their respective jack plates by respective swivel brackets, for example, swivel bracket 22 as shown for the starboard engine 16. The jack plates and the swivel brackets for the port engine 12 and the center engine 14 are substantially the same in structure and function as the jack plate 20 and the swivel bracket 22 for the starboard engine 16. Accordingly, only the jack plate 20 and the swivel bracket 22 for the starboard engine 16 are described in detail herein with the understanding that the jack plates and swivel brackets for the port engine 12 and the center engine 14 have substantially the same structure and function in substantially the same manner.

Figure 2:
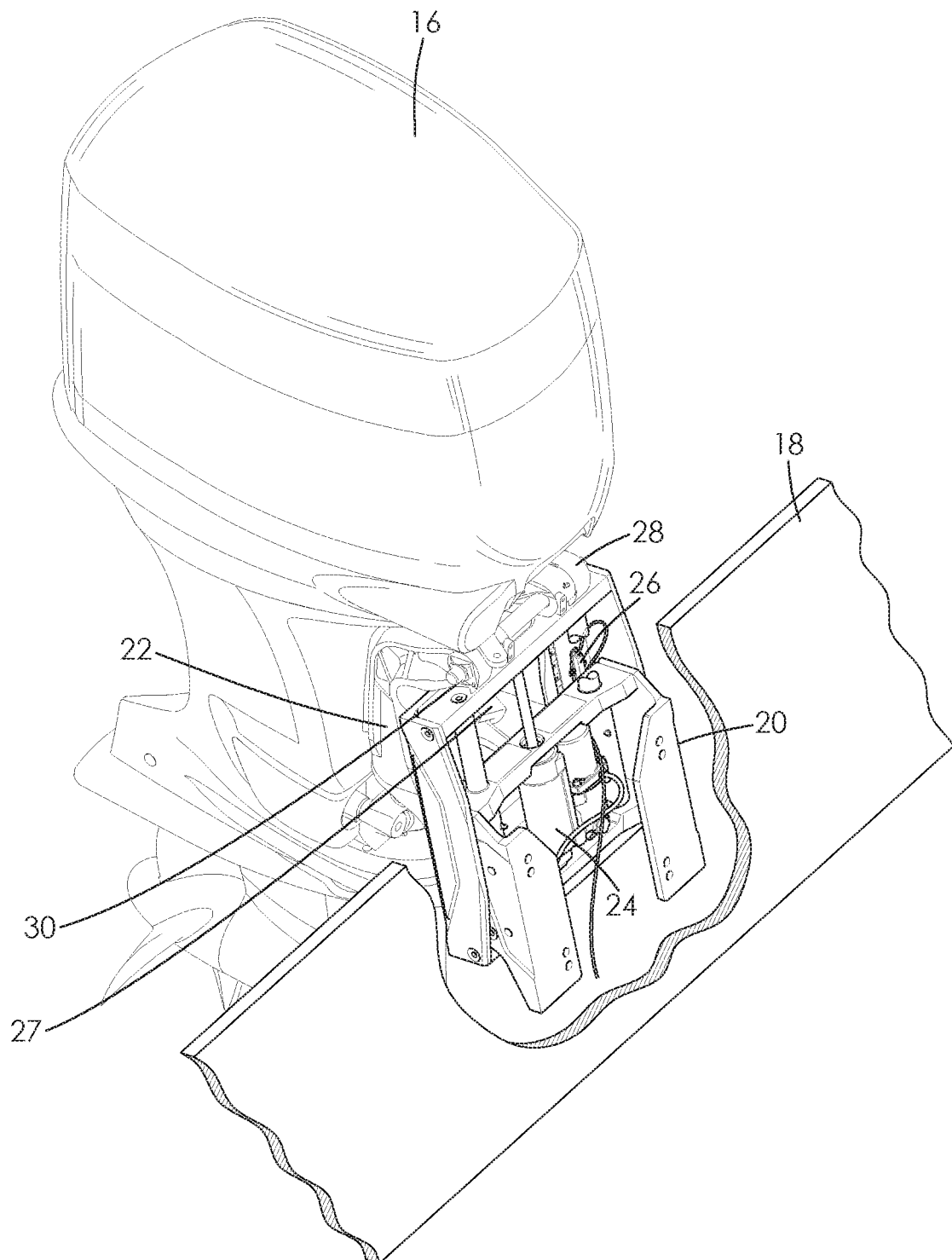
FIG. 2 is a perspective, fragmentary view showing one of the propulsion units mounted to a transom of the marine vessel of FIG. 1 with a jack plate, the propulsion unit being connected to the jack plate by a swivel bracket, the transom being partly broken away.

The jack plate 20 and swivel bracket 22 of the starboard engine 16 are shown in greater detail in FIG. 2. The jack plate 20 is provided with an actuator 24 which raises or lowers the starboard engine 16 relative to the transom 18 of the marine vessel 10. The actuator 24 is a hydraulic actuator, in this example, but the actuator 24 may be any suitable actuator. The jack plate 20 is also provided with a position sensor 26 which senses the height to which the starboard engine 16 is raised or lowered relative to the transom 18 of the marine vessel 10. The position sensor 26 is a Smart-Stick® linear position sensor, in this example, but the position sensor 26 may be any suitable position sensor. Outboard engines are typically raised for operation of a marine vessel in shallower water and lowered for operation of a marine vessel in deeper water.

There is a trim and tilt unit 27 provided with an actuator 28 which pivots the swivel bracket 22 relative to the jack plate 20. Pivoting the swivel bracket 22 relative to the jack plate 20 trims the starboard engine 16. The actuator 28 is a hydraulic actuator, in this example, but the actuator 28 may be any suitable actuator. The trim and tilt unit 27 is also provided with a trim position sensor 30 which senses a trim position of the starboard engine 16. The trim position sensor 30 is a rotary position sensor, in this example, but the trim position sensor 30 may be any suitable trim position sensor. Outboard engines are typically trimmed upwardly for operation of a marine vessel in shallower water, for example when bass fishing, and trimmed downwardly when the marine vessel is stopped at a hole and the engines are in neutral.

Referring back to FIG. 1, the marine vessel 10 is also provided with a port trim tab 40 and a starboard trim tab 42. The port trim tab 40 and the starboard trim tab 42 are each mounted on the transom 18 of the marine vessel 10 in a conventional manner. The port trim tab 40 and the starboard trim tab 42 are substantially the same in structure and function. Accordingly, only the starboard trim tab 42 is described in detail herein with the understanding that the port trim tab 40 has substantially the same structure and functions in substantially the same manner. The starboard trim tab 42 includes a hinge 44 for hingedly mounting a trim plate 46 the starboard trim tab 42 to the transom 18 of the marine vessel 10. An actuator 48 pivots the trim plate 46 relative to the transom. Pivoting the trim plate 46 relative to the transom plate 44 trims the marine vessel 10 and deploys and retracts the starboard trim tab 42. The actuator 48 is an electric actuator, in this example, but the actuator 48 may any suitable actuator. The marine vessel 10 is further provided with a shallow water anchor 50 mounted on the transom thereof. The shallow water anchor 50 is a Power-Pole® shallow water anchor, in this example, but the shallow water anchor 50 may be any suitable shallow water anchor.

There is a control station 60 that supports a steering wheel 62 mounted on a helm 64, a control head 66, and a joystick 68. The control station 60 further includes a first display interface 70 and a second display interface 72. In this example, the first display interface 70 is a SIMRAD® display interface which displays navigational information and the second display interface 72 is a OPTIMUS® display which displays onboard system information. The control station 60 allows an operator to steer the port engine 12, the center engine 14, and the starboard engine 16 using either the steering wheel 62 and the helm 64 or the joystick 68 as disclosed in PCT International Application Publication Number WO 2013/123208 which is incorporated herein by reference.

The control station 60 also includes a control lever 74 mounted on the helm 64. The control lever 74 is a PRO-TRIM® control lever which is in communication with a controller 76. The control lever 74 allows an operator to raise or lower the port engine 12, the center engine 14, and the starboard engine 16, and the control lever 74 allows the operator to trim and tilt the port engine 12, the center engine 14, and the starboard engine 16, as disclosed in U.S. Pat. No. 9,896,173 which is incorporated herein by reference.

Figure 3:
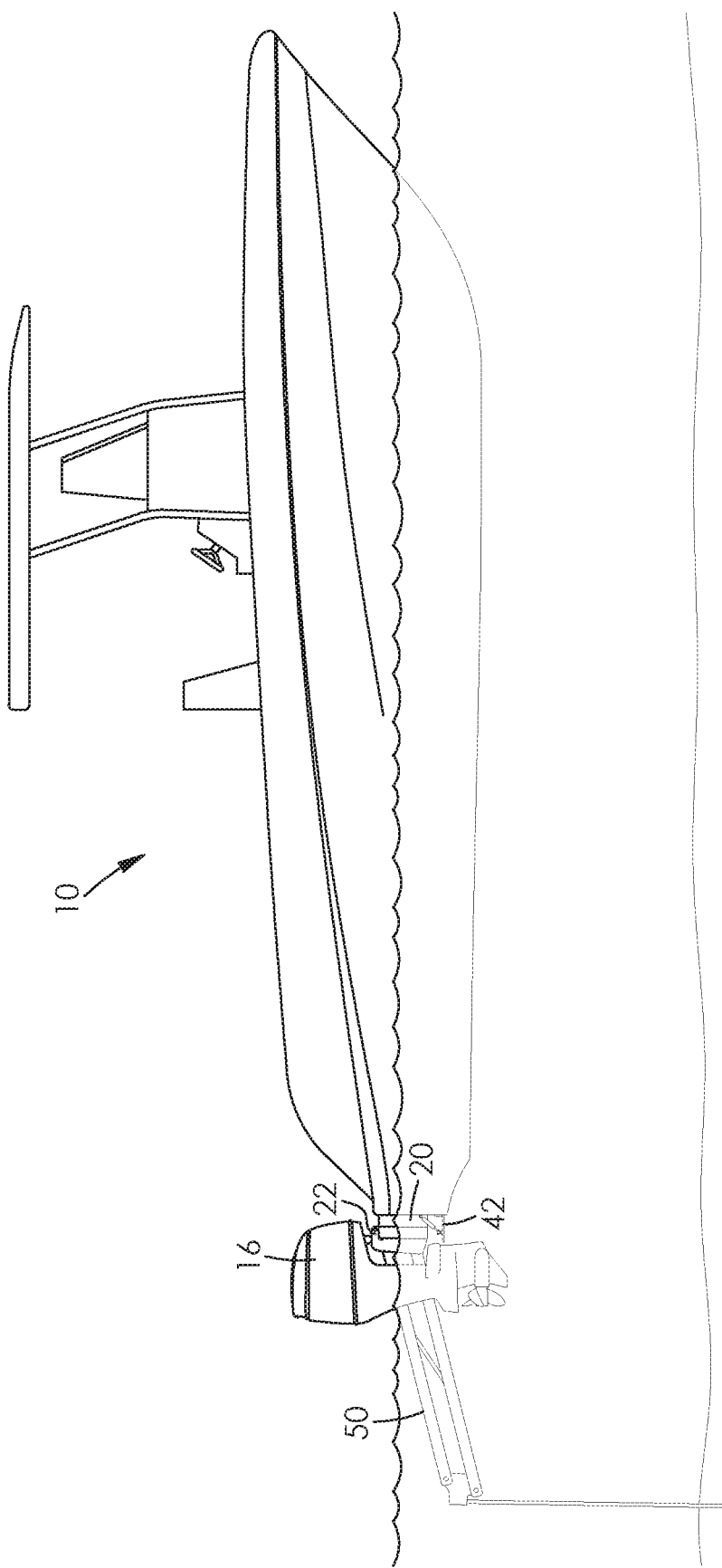
FIG. 3 is a schematic view of the marine vessel of FIG. 1 showing the propulsion units trimmed down and a shallow water anchor in a deployed configuration.
Figure 4:
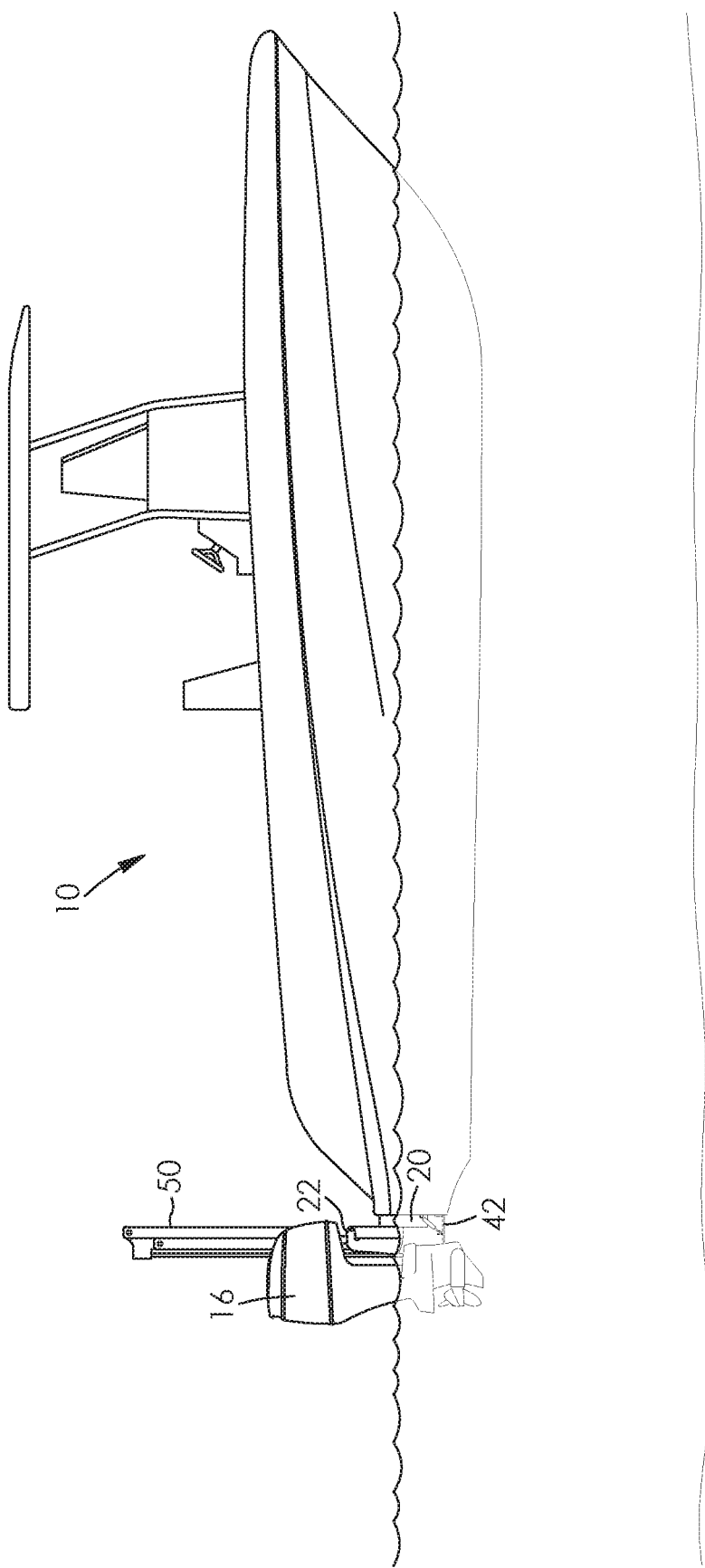
FIG. 4 is a schematic view of the marine vessel of FIG. 1 showing the propulsion units being trimmed upwardly and a shallow water anchor being moved to a retracted configuration.
Figure 5:
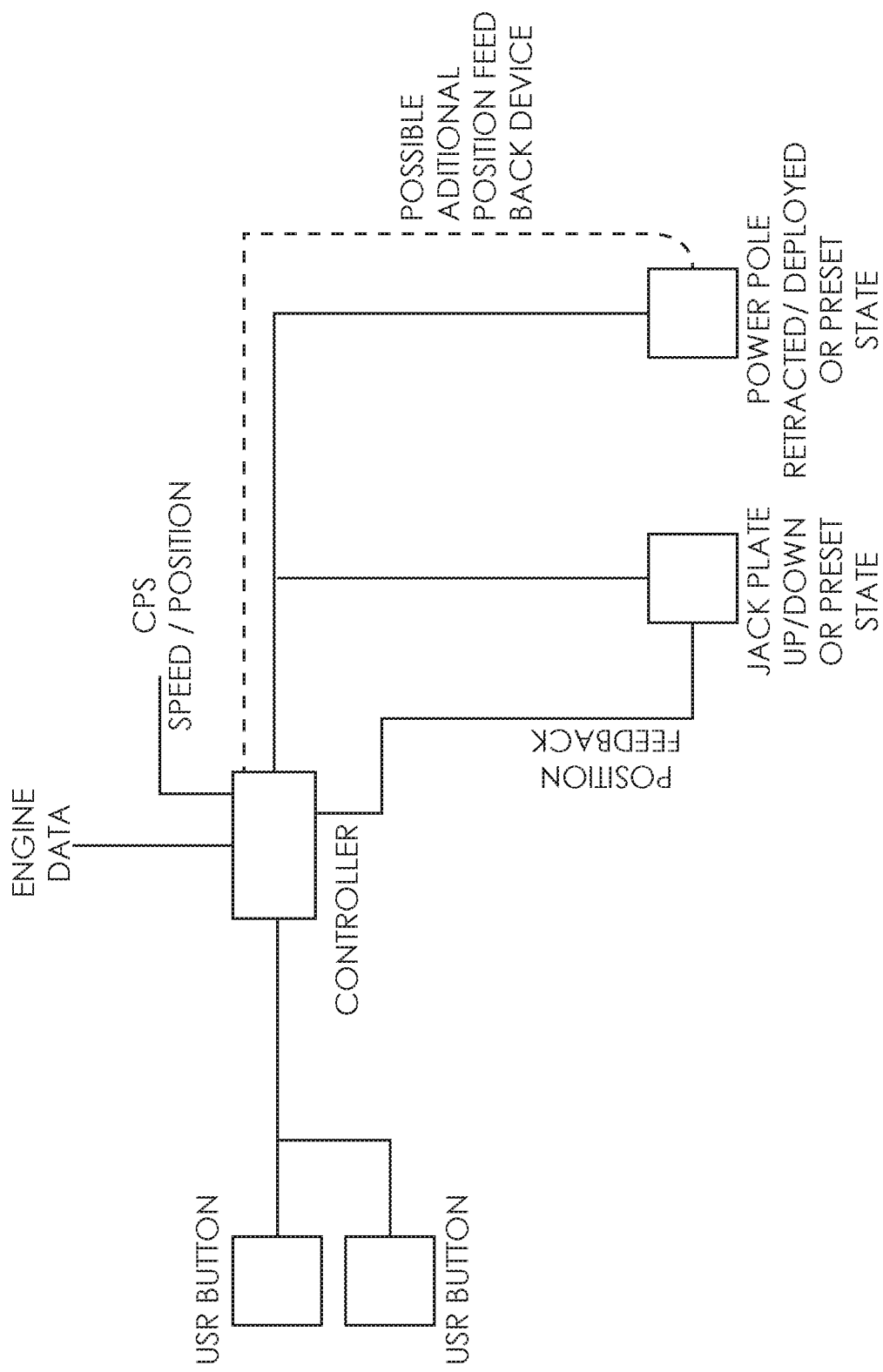
FIG. 5 is a logic diagram showing a logic of raising and lowering the propulsion units, and moving the shallow water anchor between the deployed configuration and the retracted configuration.

The control station 60 further includes an input device 78 which is in communication with the controller 76. The input device 78 allows an operator to raise the port engine 12, the center engine 14, and the starboard engine 16 while moving the shallow water anchor 50 between the deployed configuration and the retracted configuration. Raising the propulsion units and moving the shallow water anchor from the deployed configuration to the retracted configuration occur when the operator command is entered and the engine RPM or vessel speed are below a threshold. FIG. 3 shows the starboard engine 16 lowered and the shallow water anchor 50 in the deployed configuration. It will be understood by a person skilled in the art that the port engine 12 and the center engine 14 are also lowered and FIG. 3 shows the marine vessel 10 when the marine vessel 10 is anchored, for example, at a hole during bass fishing and the port engine 12, the center engine 14, and the starboard engine 16 are in neutral. The input device 78 allows an operator to raise the port engine 12, the center engine 14, and the starboard engine 16, as shown in FIG. 4 for the starboard engine 16, while the shallow water anchor 50 is being moved from the deployed configuration to the retracted configuration. It is desirable to raise the port engine 12, the center engine 14, and the starboard engine 16, and it is necessary to retract the shallow water anchor 50 prior to a hole shot. FIG. 5 is a logic diagram showing a logic of raising and lowering the propulsion units, and moving the shallow water anchor between the deployed configuration and the retracted configuration The port engine 12, the center engine 14, and the starboard engine 16 may also be trimmed down while the engines are being raised and/or while the shallow water anchor 50 is being moved from the deployed configuration to the retracted configuration. The controller 76 may monitor engine RPM or vessel speed to be below a threshold to retract or deploy the shallow water anchor for safety.

Figure 6:
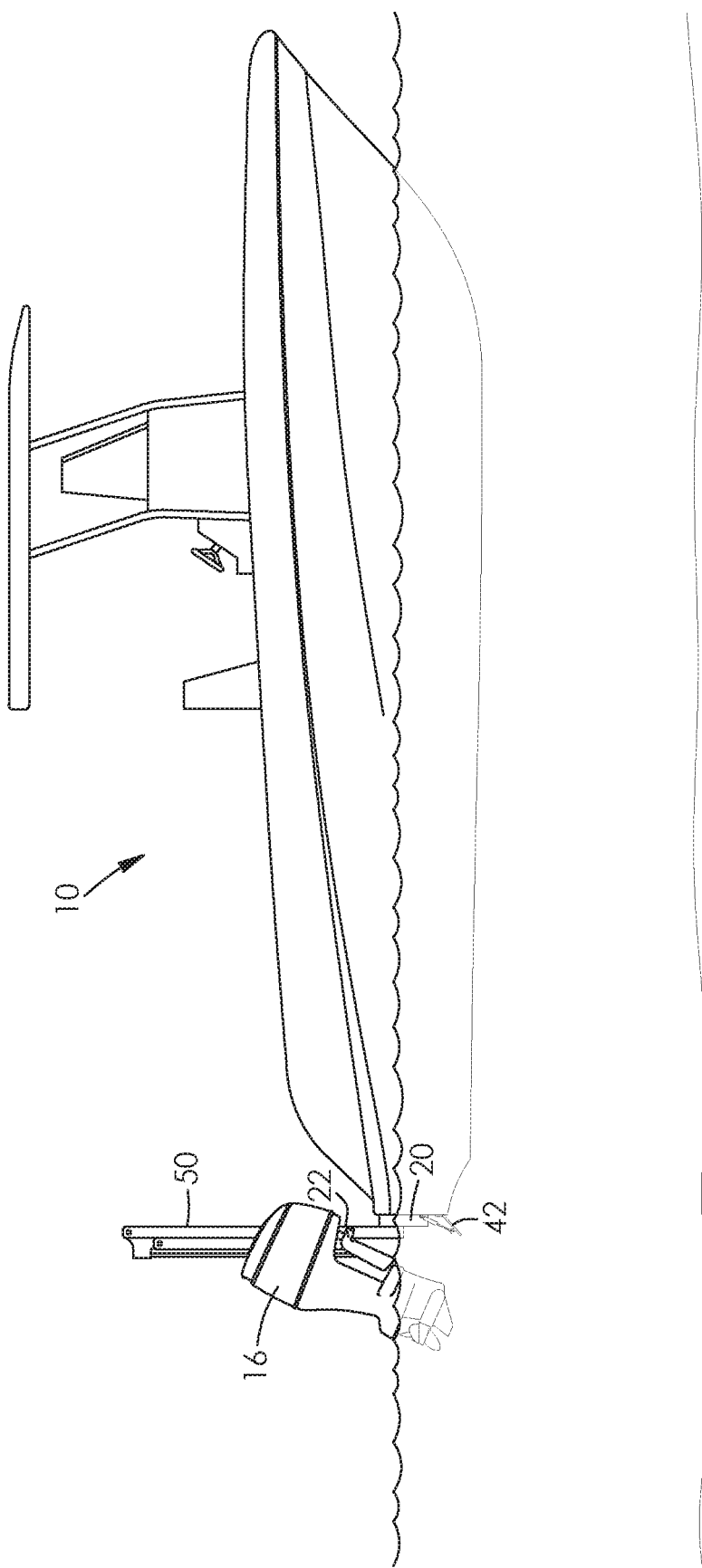
FIG. 6 is a schematic view of the marine vessel of FIG. 1 showing the starboard propulsion unit being trimmed and the starboard trim tab being deployed.
Figure 7:
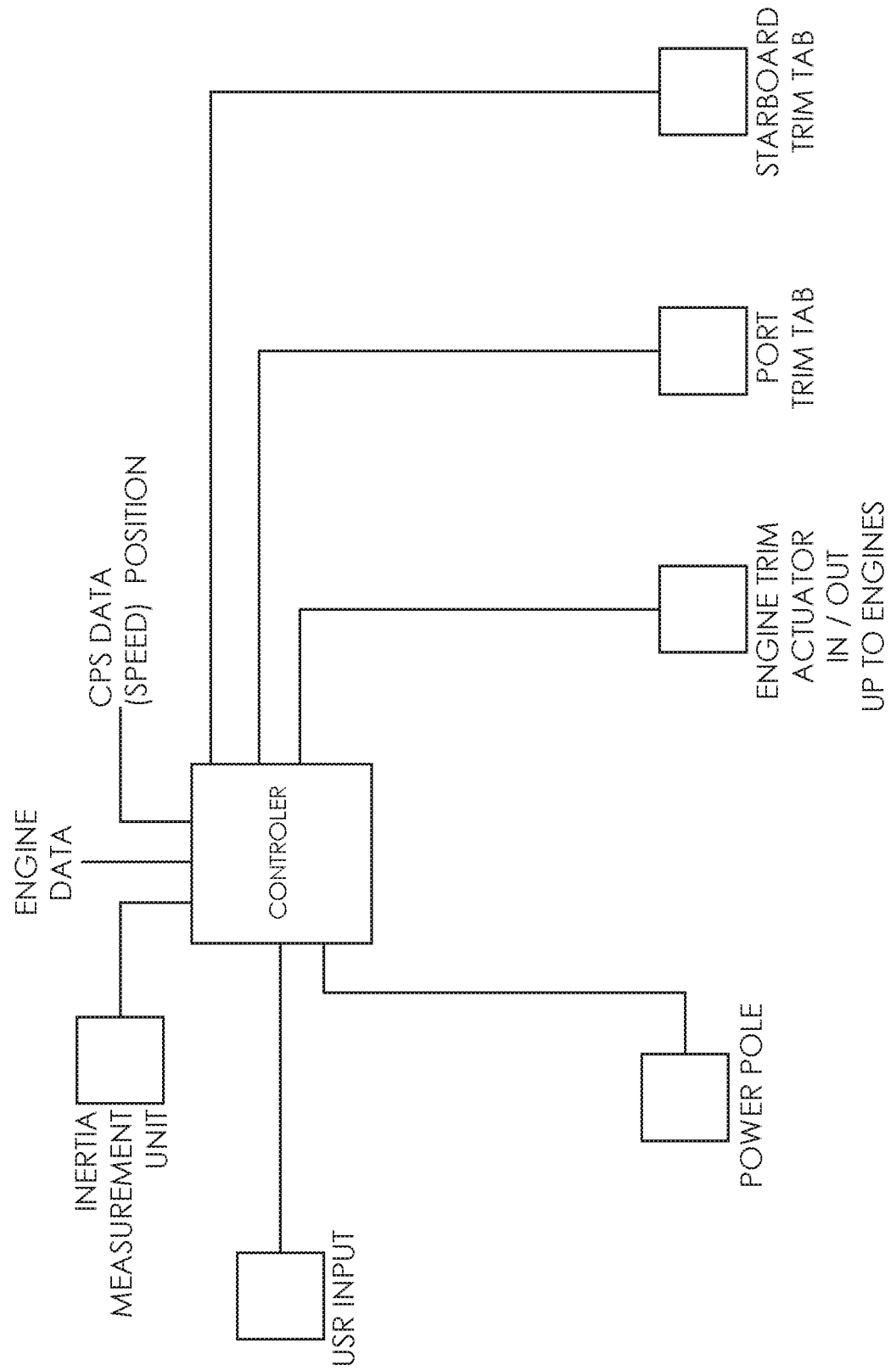
FIG. 7 is a logic diagram showing a logic of trimming the propulsion units and deploying the trim tabs.

Referring back to FIG. 1, there is also an input device 80 which allows an operator to downwardly trim the port engine 12, the center engine 14, and the starboard engine 16, while pivoting the port trim tab 40 and the starboard trim tab 42 downwardly, or to a deployed configuration, in order to increase performance during a hole shot. Following the downward trimming of the port engine 12, the center engine 14, and the starboard engine 16, and deployment of the port trim tab 40 and the starboard trim tab 42, the operator may apply a strong engine thrust to accelerate the marine vessel 10 to get on plane quickly (shot up from the hole). The strong thrust acting on propellers of the port engine 12, the center engine 14, and the starboard engine 16 will pitch the front of the marine vessel 10. Water acting on the downwardly on the port trim tab 40 and the starboard trim tab 42 results in a counteracting torque to pitch a front of the marine vessel 10 downwardly. These combined actions help balance the torque acting upon the marine vessel 10 to keep the marine vessel 10 more level. FIG. 6 shows the starboard engine 16 being trimmed upwardly and the starboard trim tab 42 being deployed. FIG. 7 is a logic diagram showing a logic of trimming the propulsion units and deploying the trim tabs. It will be understood by a person skilled in the art that the port engine 12 and the center engine 14 are also being trimmed downwardly and the port trim tab 40 is also deployed. The simultaneous actuation of both the engine trim and trim tabs may also be applied to a single engine marine vessel. Raising and lowering of the propulsion units and deployment of the trim tabs occur when the operator command is inputted and the engine RPM or vessel speed are below a threshold.

Figure 8:
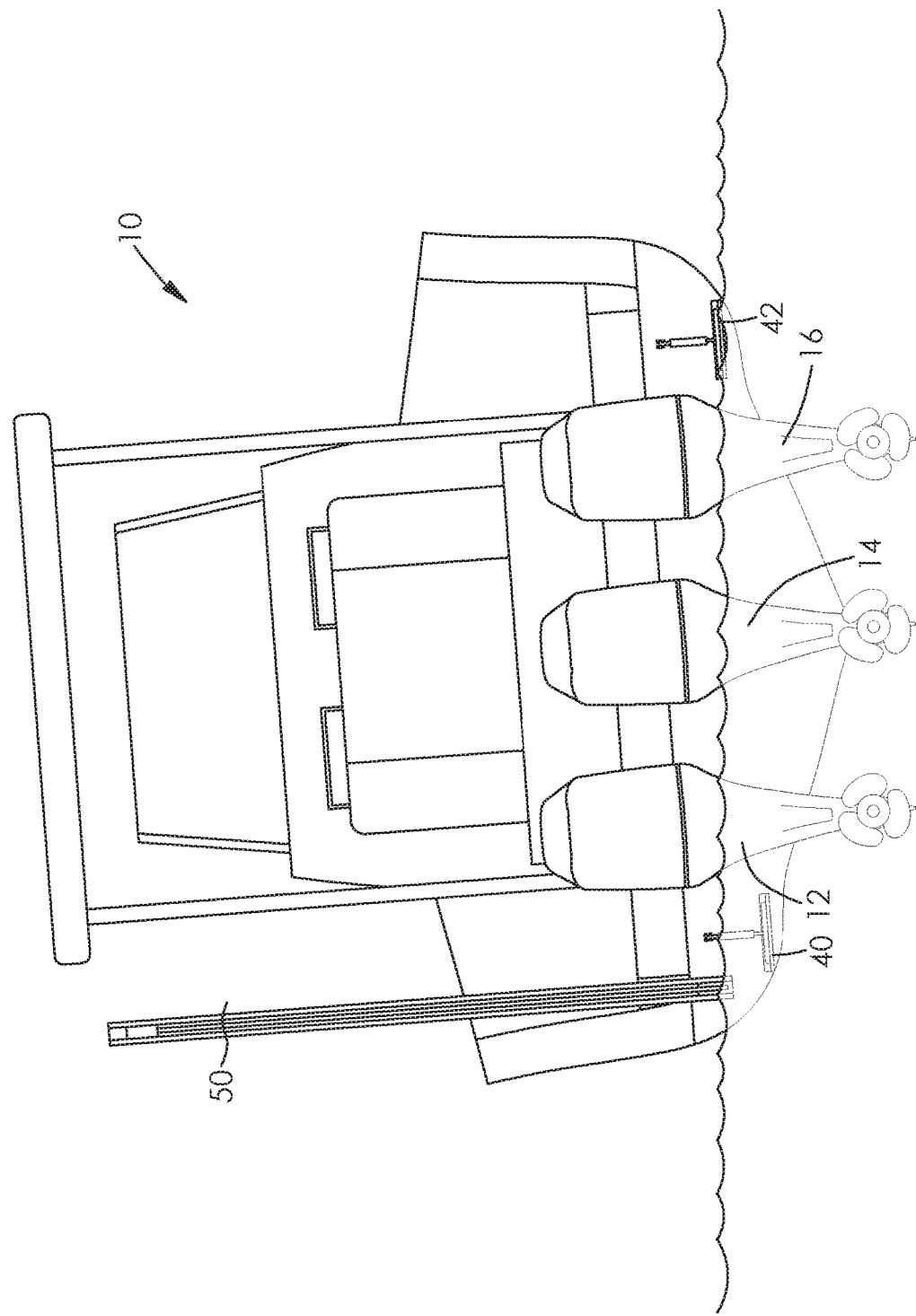
FIG. 8 is a schematic view of the marine vessel of FIG. 1 showing the starboard propulsion unit being lowered as the marine vessel is steered into a turn.
Figure 9:
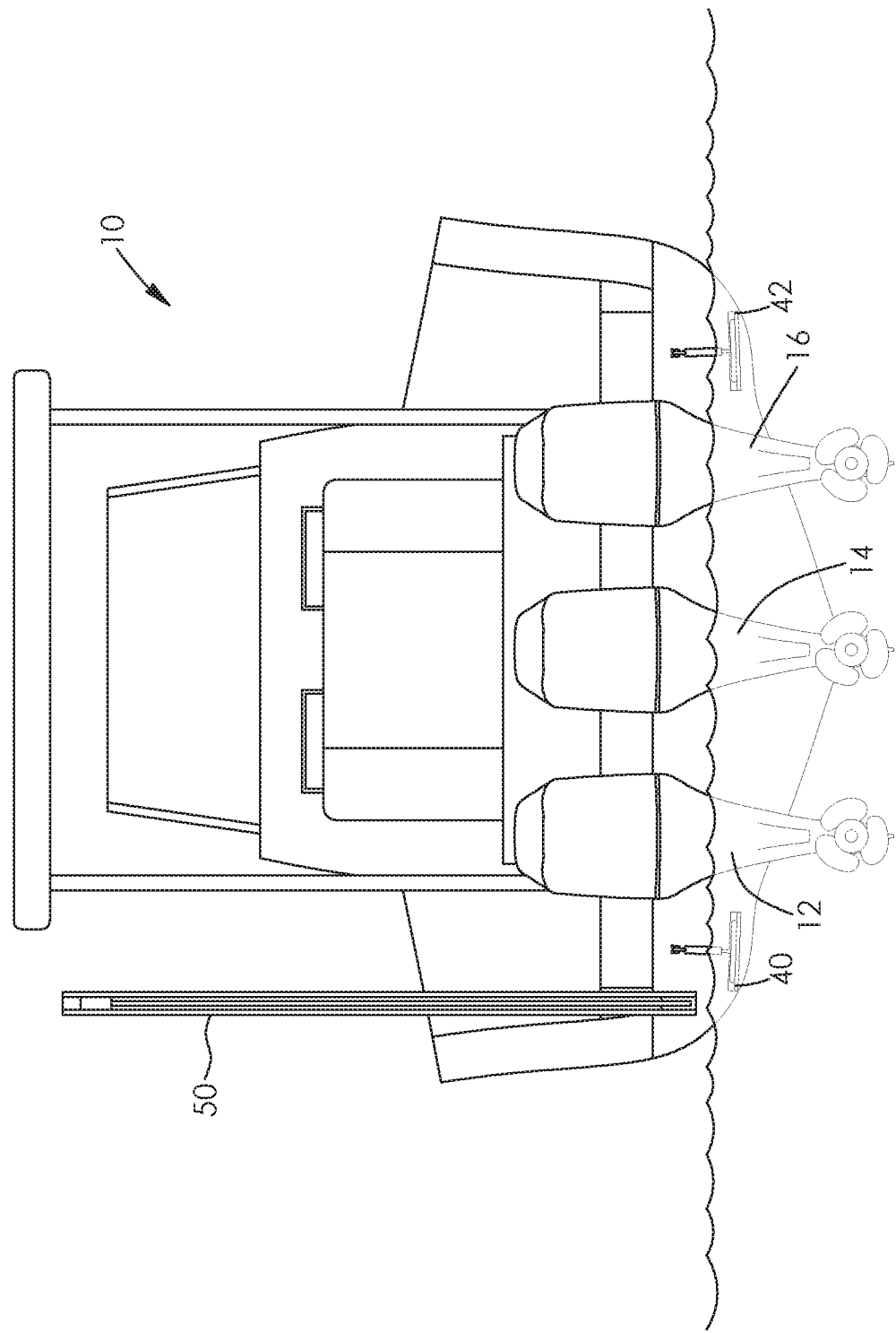
FIG. 9 is a schematic view of the marine vessel of FIG. 1 showing the starboard propulsion unit being raised as the marine vessel is steered out of a turn.
Figure 10:
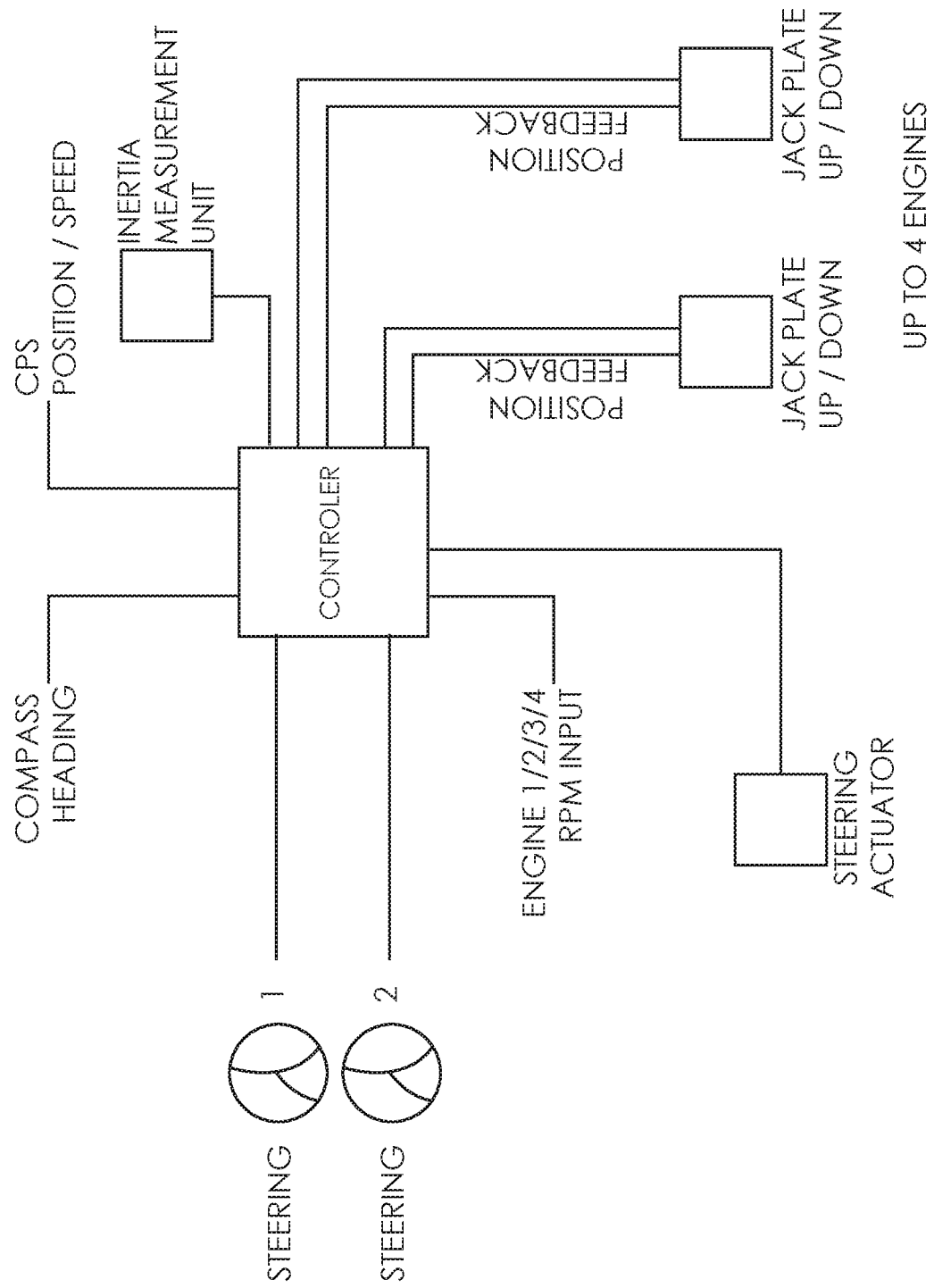
FIG. 10 is a logic diagram showing a logic of raising and lowering at least one of the port propulsion unit and the starboard propulsion unit based on a steering command.

The controller 76 may raise or lower the port engine 12, the center engine 14, and/or the starboard engine 16 during steering by either engine trim systems or jack plates. For example, the controller 76 may lower the starboard engine 16, as shown in FIG. 8, when the marine vessel 10 is steered into a port turn. Lowering the starboard engine 16 will keep the propeller in the water to avoid cavitation, and will keep the water intake in the water to avoid engine overheating, as the marine vessel 10 rolls during the port turn. This may improve propulsion thrust and engine cooling. The controller 76 may also raise the starboard engine 16, as shown in FIG. 9, when the marine vessel 10 is steered out of the left turn. It will be understood by a person skilled in the art that the controller 76 may likewise lower the port engine 12 when the marine vessel 10 is steered into a starboard turn. FIG. 10 is a logic diagram showing a logic of raising and lowering at least one of the port propulsion unit and the starboard propulsion unit based on a steering command.

Figure 11:
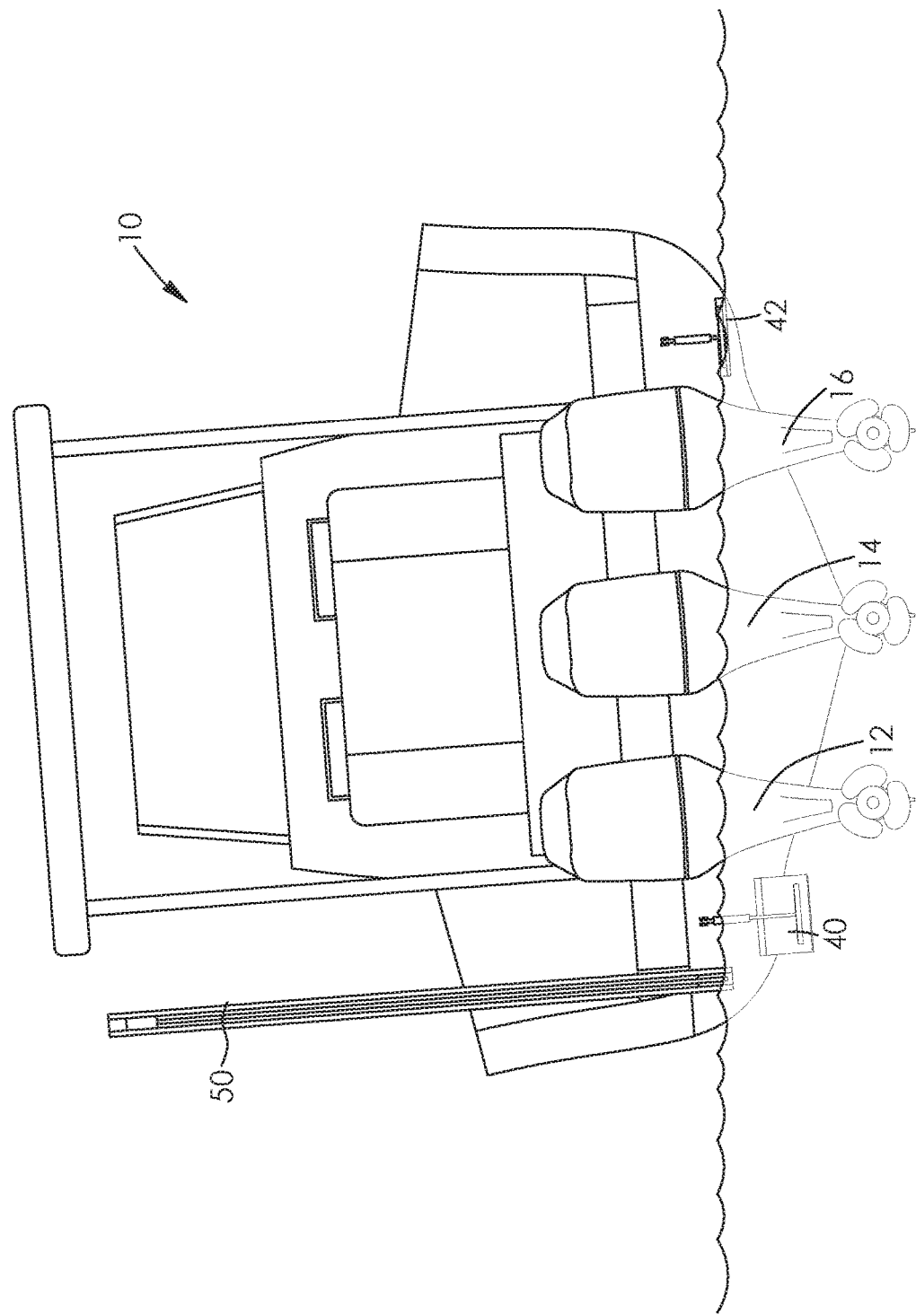
FIG. 11 is a schematic view of the marine vessel of FIG. 1 showing the starboard propulsion unit being lowered and the port trim tab being deployed as the marine vessel rolls.
Figure 12:
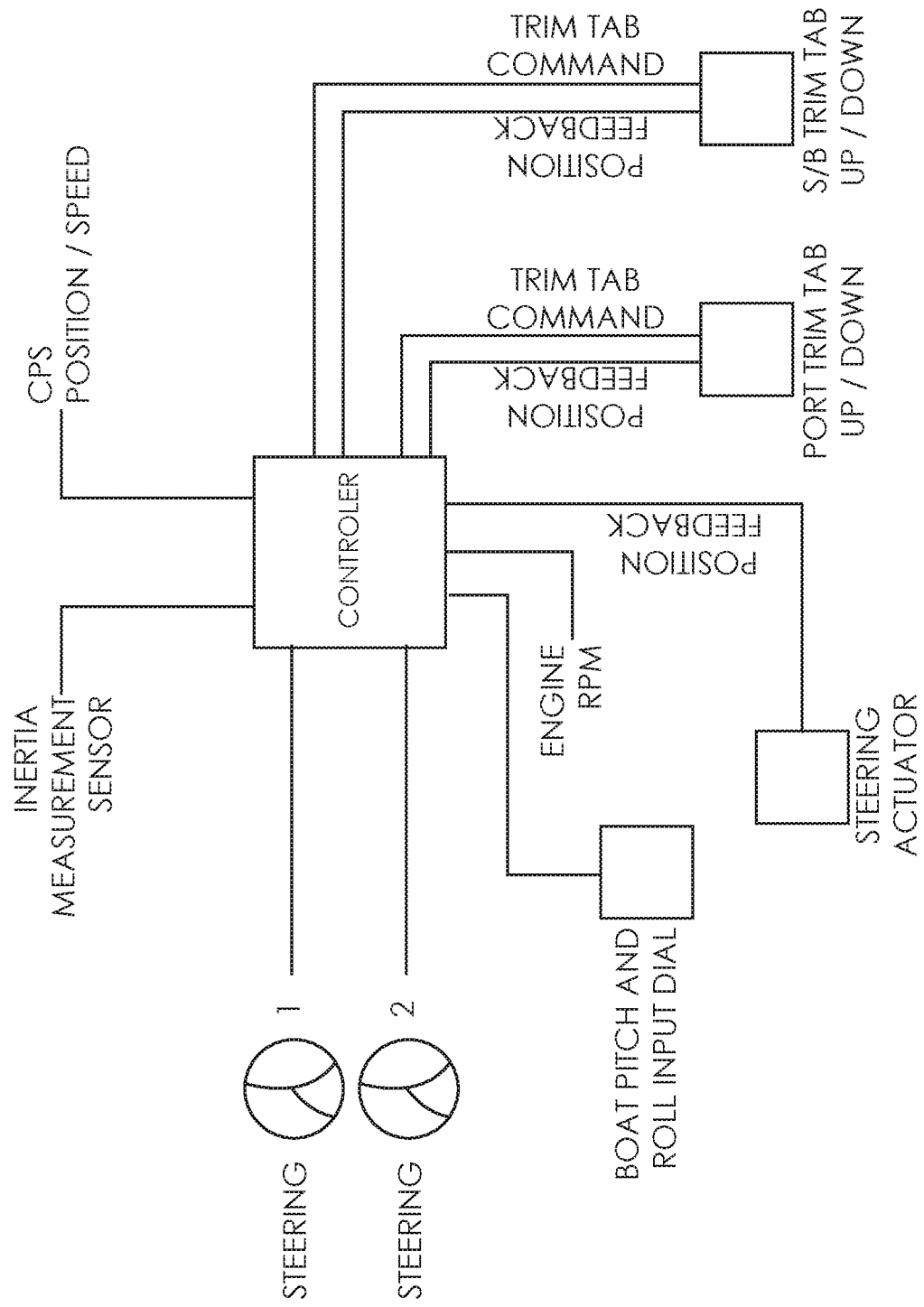
FIG. 12 is a logic diagram showing a logic of deploying at least one of the port trim tab and the starboard trim tab based on a steering command, RPM, and/or speed.

The controller 76 may also deploy the port trim tab 40 and/or the starboard trim tab 42 during steering. For example, the controller 76 may deploy the port trim tab 40, as shown in FIG. 11, when the marine vessel rolls. FIG. 12 is a logic diagram showing a logic of deploying at least one of the port trim tab and the starboard trim tab. It will be understood by a person skilled in the art that the controller may likewise deploy the starboard trim tab 42, or both the port trim tab 40 and the starboard trim tab 42 during steering. The raising and lowering of the engines and the deployment of the trim tabs may be based on heave, RPM, fuel burn, and/or speed. On marine vessels with multiple engines, each engine may be mounted on a respective jack plate. When the vessel is going in a straight ahead direction, all engines can be raised to reduce drag on all engine lower units. When the vessel is turning and rolled toward the center of rotation, the controller will lower the engines further away from the center of rotation on an as-needed basis to maintain its propeller under water. This allows marine vessel manufacturers to mount the engine higher than traditional practice to increase vessel speed and to increase fuel economy.

Figure 13:
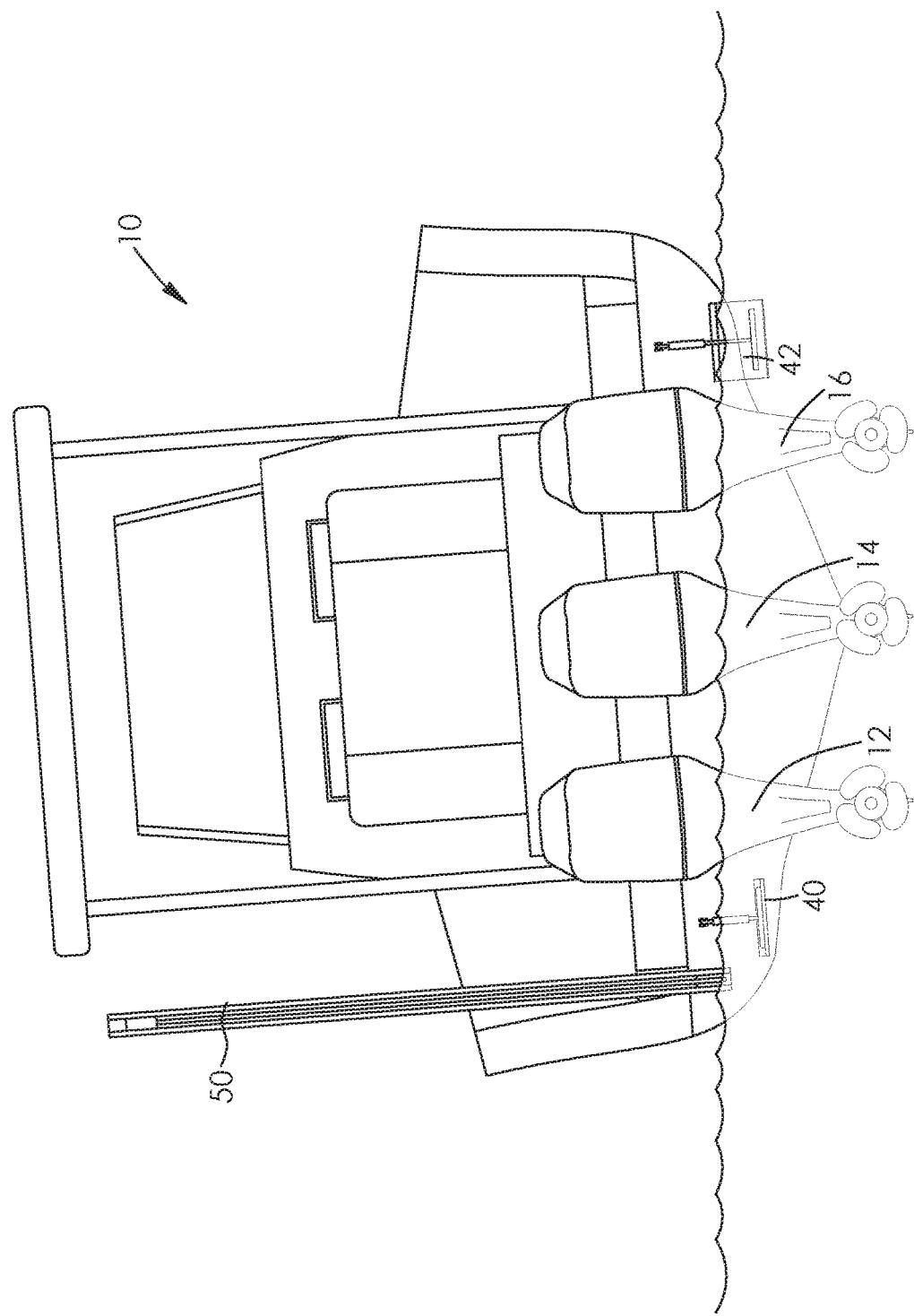
FIG. 13 is a schematic view of the marine vessel of FIG. 1 showing the starboard trim tab being deployed as the marine vessel is steered in the port direction.

An operator may also use the steering wheel 62 and the helm 64 or the joystick 68 to deploy or retract the port trim tab 40 or the starboard trim tab 42 during steering. This induces a roll motion to the marine vessel 10 such that a side of the marine vessel 10 closer to the turning side is lower. For example, as shown in FIG. 13, when the marine vessel 10 is steered to turn in the port direction, the port trim tab 40 is retracted while the starboard trim tab 42 is deployed. These trim tab positions generate a differential lift which rolls the marine vessel in the starboard direction. This results in centrifugal forces from turning being better aligned with a grounding surface, e.g. a floor or seat of the marine vessel, and as a result the operator feels more grounded. This also assists a planning hull with a v-shaped bottom steer into the turn due to hydrodynamic characteristics. The port trim tab 40 and the starboard trim tab 42 accordingly work synergistically with the steering system to help the marine vessel roll. The differential between the port trim tab 40 position and the starboard trim tab 42 position is related to the degree of steering, in terms of steering angle or rate of change of heading, and marine vessel 10 speed, in term of GPS position or engine RPM. Optionally, the vessel roll angle can be closed loop controlled from the boat attitude, or row angle, from an inertia measurement sensor. The timing of the steering actuation and trim tab actuation are significant. When the steering angle is increasing, the trim tabs are actively adding roll to the boat. When the steering angle is decreasing, the trim tabs are actively reducing roll to the boat.

When a heading of the marine vessel 10 is inputted using the steering wheel 62 and the helm 64, at certain speeds as indicated by a GPS position and engine RPM, the marine vessel 10 may tilt to one side due to uneven weight distribution. This is known as listing which is measured using an inertia measurement sensor. The operator may input an operator command to initiate a listing correction through a boat pitch and roll input dial 79 which is shown in FIG. 1. The controller 76 will simultaneously drive the steering system to apply a compensating steering actuator movement to counteract the differential drag to keep the boat in the same heading. It is important to apply the differential lift and steering movement together and early to avoid undesirable heading change of the vessel and to keep the compensating steering movement small. Optionally, the boat heading or turn rate in general is further closed loop controlled by the controller with feedback signal from a heading sensor.

Figure 14:
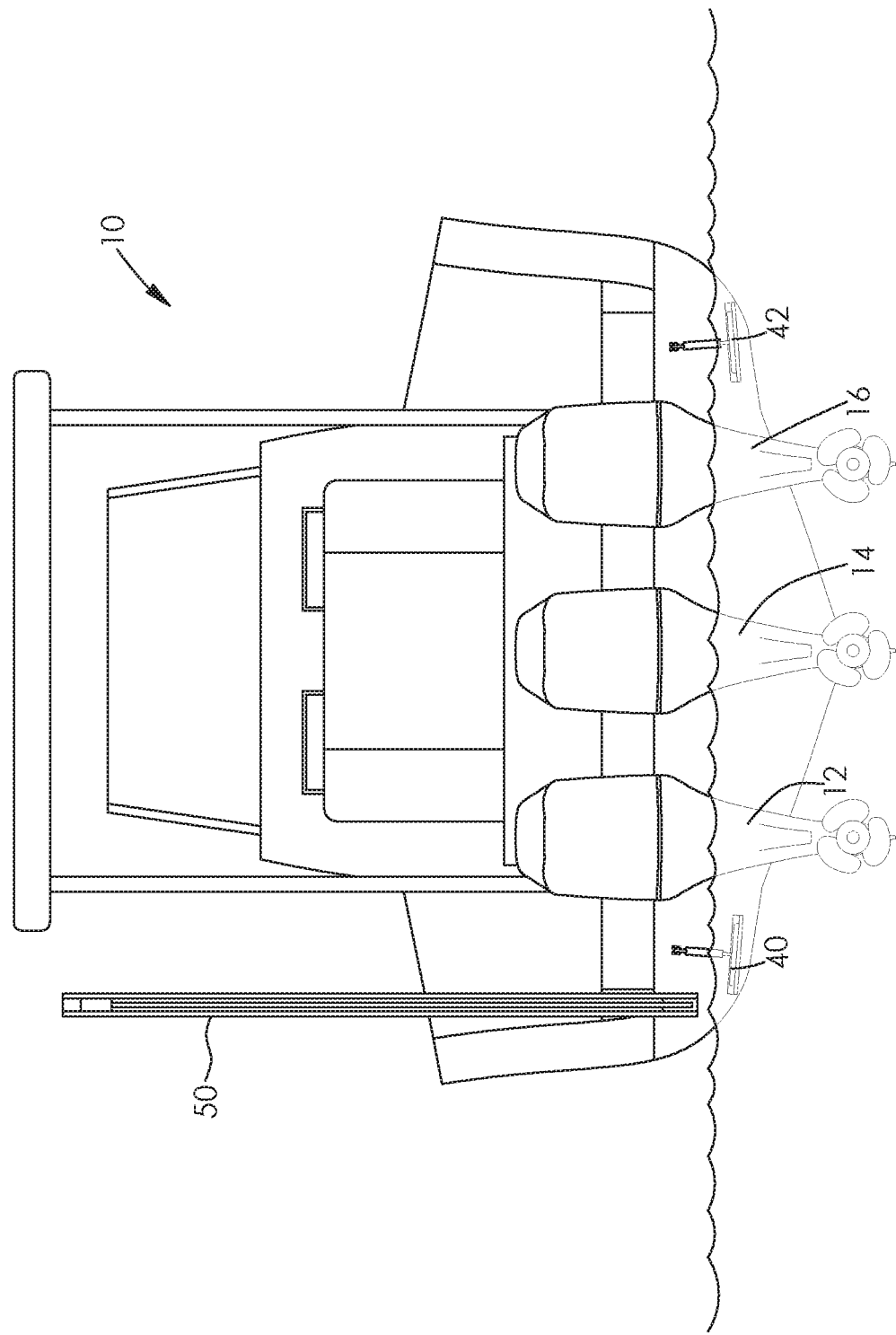
FIG. 14 is a schematic view of the marine vessel of FIG. 1 showing the port trim tab and the starboard trim tab being retracted as the marine vessel is steered in the reverse direction.

An operator may also use the joystick 68 to steer the marine vessel 10 in forward direction, reverse direction, sideways direction, or rotate the marine vessel. The port trim tab 40 and the starboard trim tab 42 are retracted, as shown on FIG. 14, to allow free flow of water around the marine vessel 10 when the joystick 68 to steer the marine vessel 10. Likewise, an operator may use the control head 66 to steer the marine vessel 10 in the forward direction and the reverse direction. The port trim tab 40 and the starboard trim tab 42 are also retracted, as shown on FIG. 14, to allow free flow of water around the marine vessel 10 when the control head 66 to steer the marine vessel 10. Optionally, port trim tab 40 and the starboard trim tab 42 are retracted when a controller detects the gear command or the actual gear position to detect steering in the reverse direction.

Figure 15:
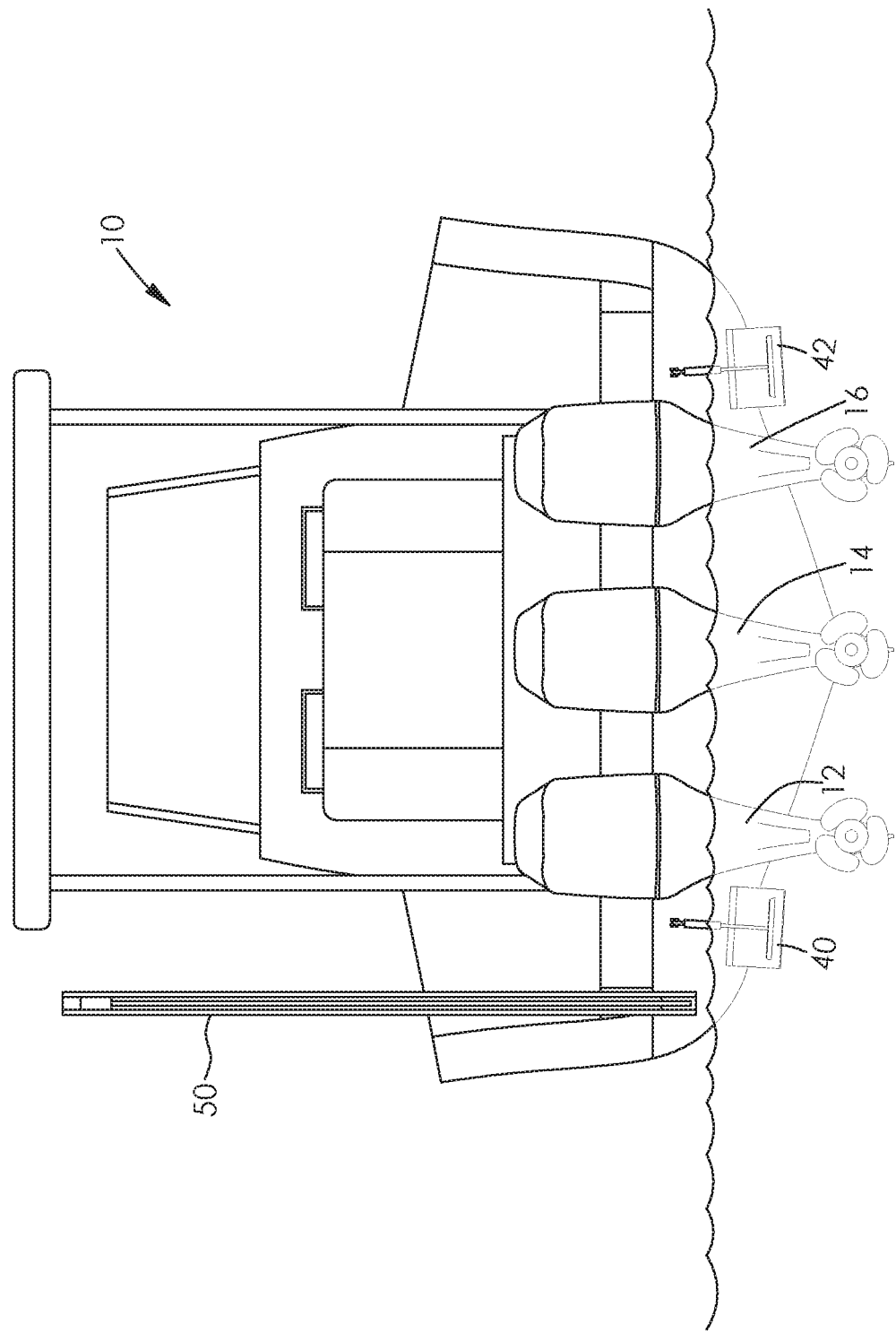
FIG. 15 is a schematic view of the marine vessel of FIG. 1 showing the port trim tab and the starboard trim tab being deployed as the marine vessel is accelerated in the forward direction.

When the power planning marine vessel is stationery, to assist accelerating the boat to get on plane as fast as possible, i.e. hole shot, the controller detects when the control head 66 is rapidly change from neutral to a high forward position and the controller automatically deploys the port trim tab 40 and the starboard trim tab 42 as shown in FIG. 15. This allows the bow and the engine propeller to maintain a roughly horizontal thrust vector and remain well under water to maximize thrust for maximum acceleration. While the marine vessel 10 is getting up to speed with a programming time delay, typically three to six seconds, the controller drives the trim tab actuators to a predefined on-plane position. The position is programmable, for example, during initial sea trial of a model of marine vessel hull.

Figure 16:
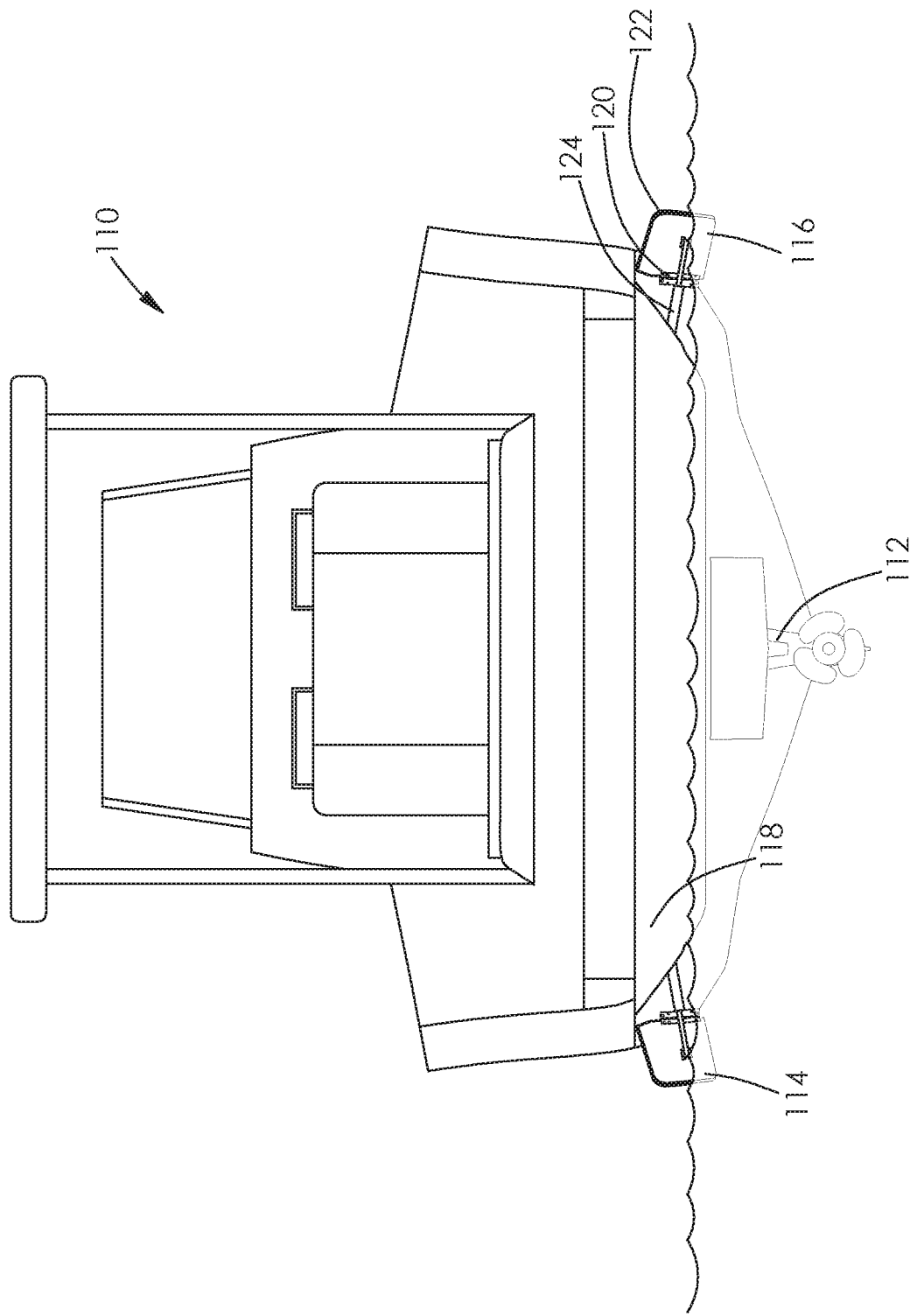
FIG. 16 is a schematic view of another marine vessel showing a port wake gate and the starboard wake gate being deployed.
Figure 17:
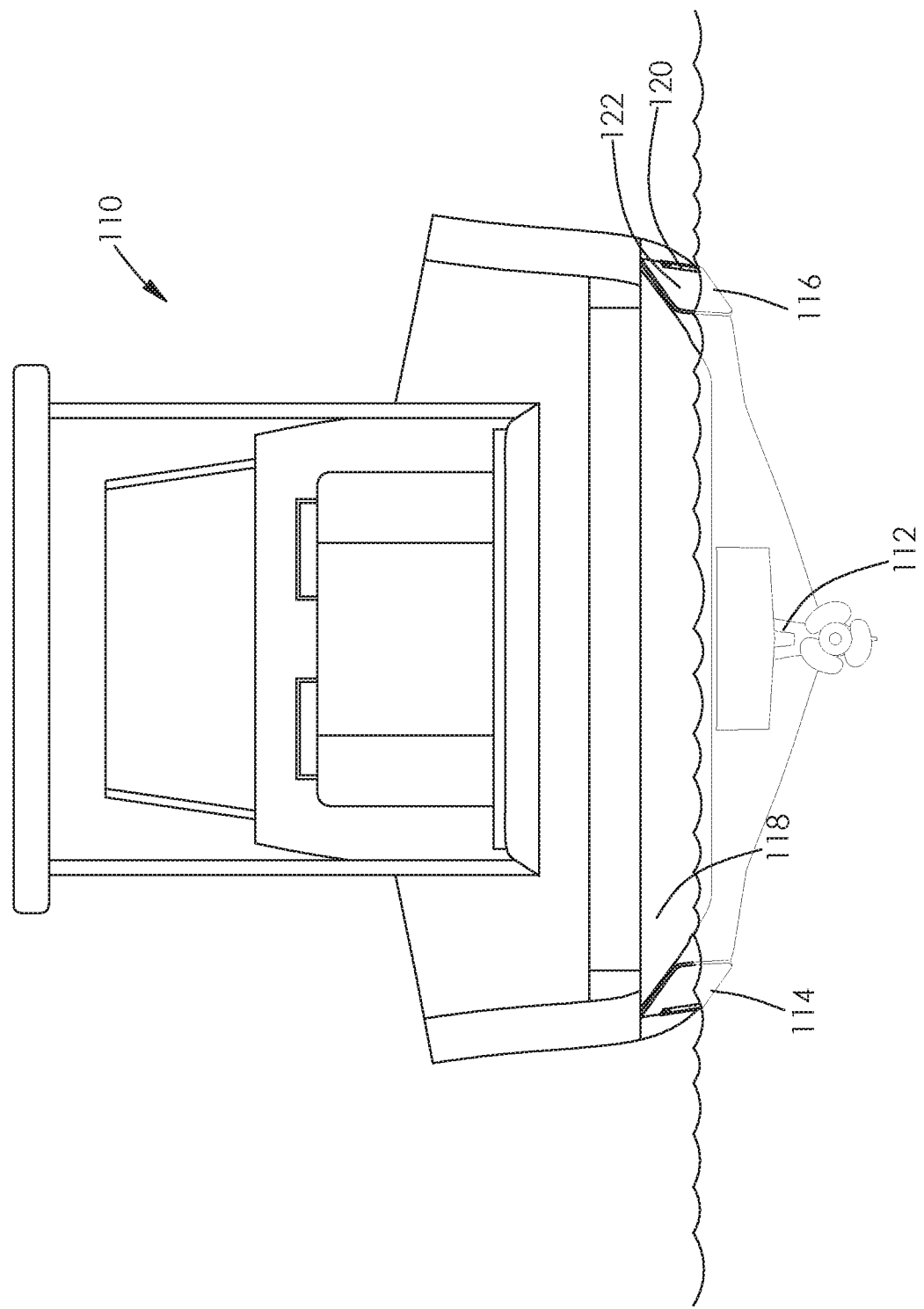
FIG. 17 is a schematic view of the marine vessel of FIG. 16 showing a port wake gate and the starboard wake gate being retracted.

The system as thus far disclosed is depicted in a marine vessel with outboard propulsion units that can be steered and tilted. However, the system will also work with inboard engine boats that has separate rudders that are detached from the propulsion units. The system will not only work with multiple engine marine vessels, as well as with single marine vessels. For example, and with reference to FIGS. 16 and 17, there is shown another marine vessel 110 which is provided with a single propulsion unit which, in this example, is in the form of an inboard engine 112. The marine vessel 110 is also provided with a port wake gate 114 and a starboard wake gate 116. The port wake gate 114 and the starboard wake gate 116 are each mounted on a transom 118 of the marine vessel 110 in a conventional manner. The port wake gate 114 and the starboard wake gate 116 are substantially the same in structure and function. Accordingly, only the starboard wake gate 116 is described in detail herein with the understanding that the port wake gate 114 has substantially the same structure and functions in substantially the same manner. The starboard wake gate 116 includes a hinge 120 for mounting the starboard wake gate 116 to the marine vessel 110. There is a wake tab 122 pivotably coupled to the hinge 120. An actuator 124 pivots the wake tab 122. Pivoting the wake plate 126 relative to the transom 118 deploys and retracts the wake plate 126. The actuator 124 is an electric actuator, in this example, but the actuator 124 may any suitable actuator.

Figure 18:
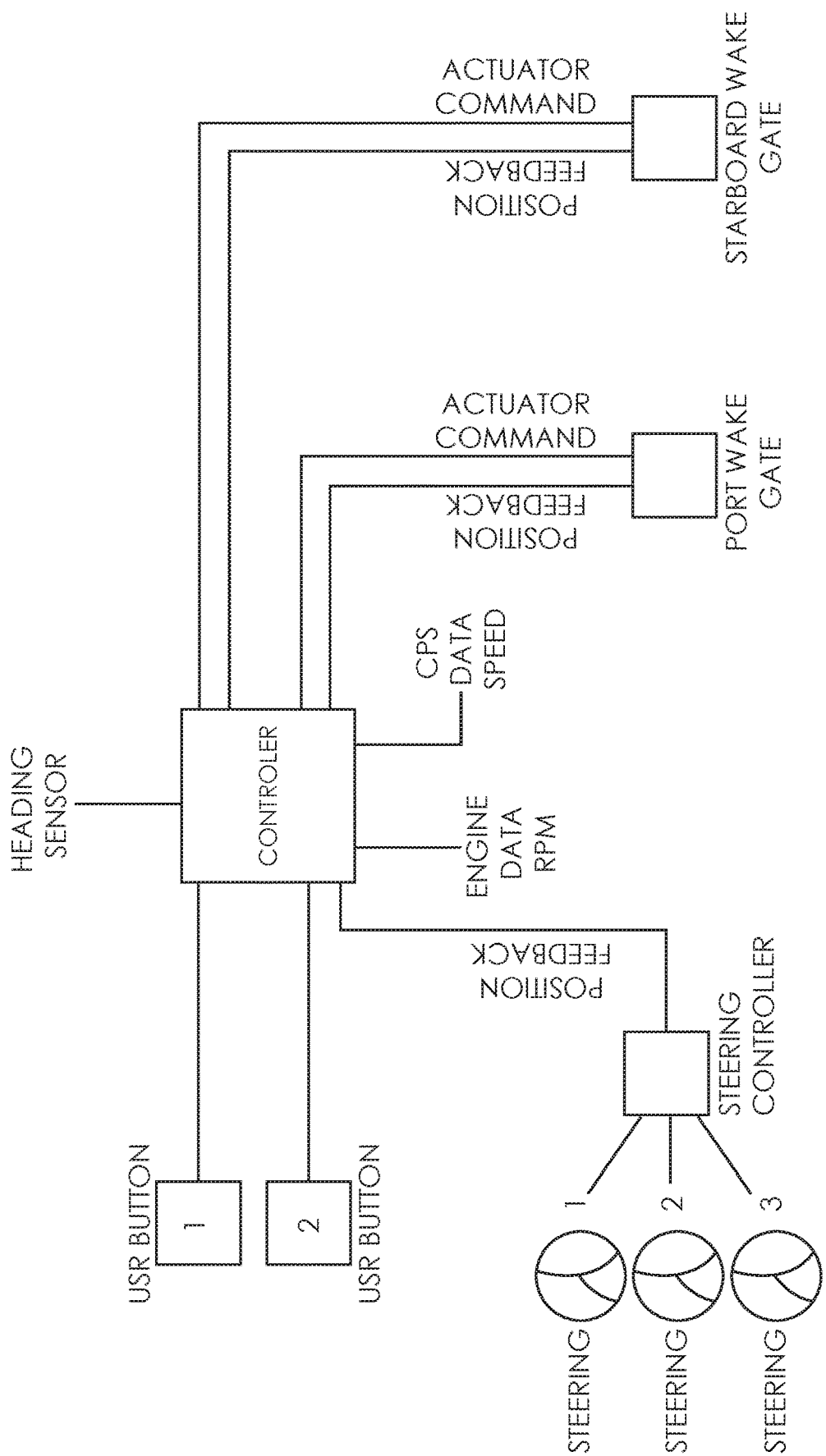
FIG. 18 is a logic diagram showing a logic of deploying at least one of the port wake gate and the starboard wake gate based on a steering command, RPM, and/or speed.
Figure 19:
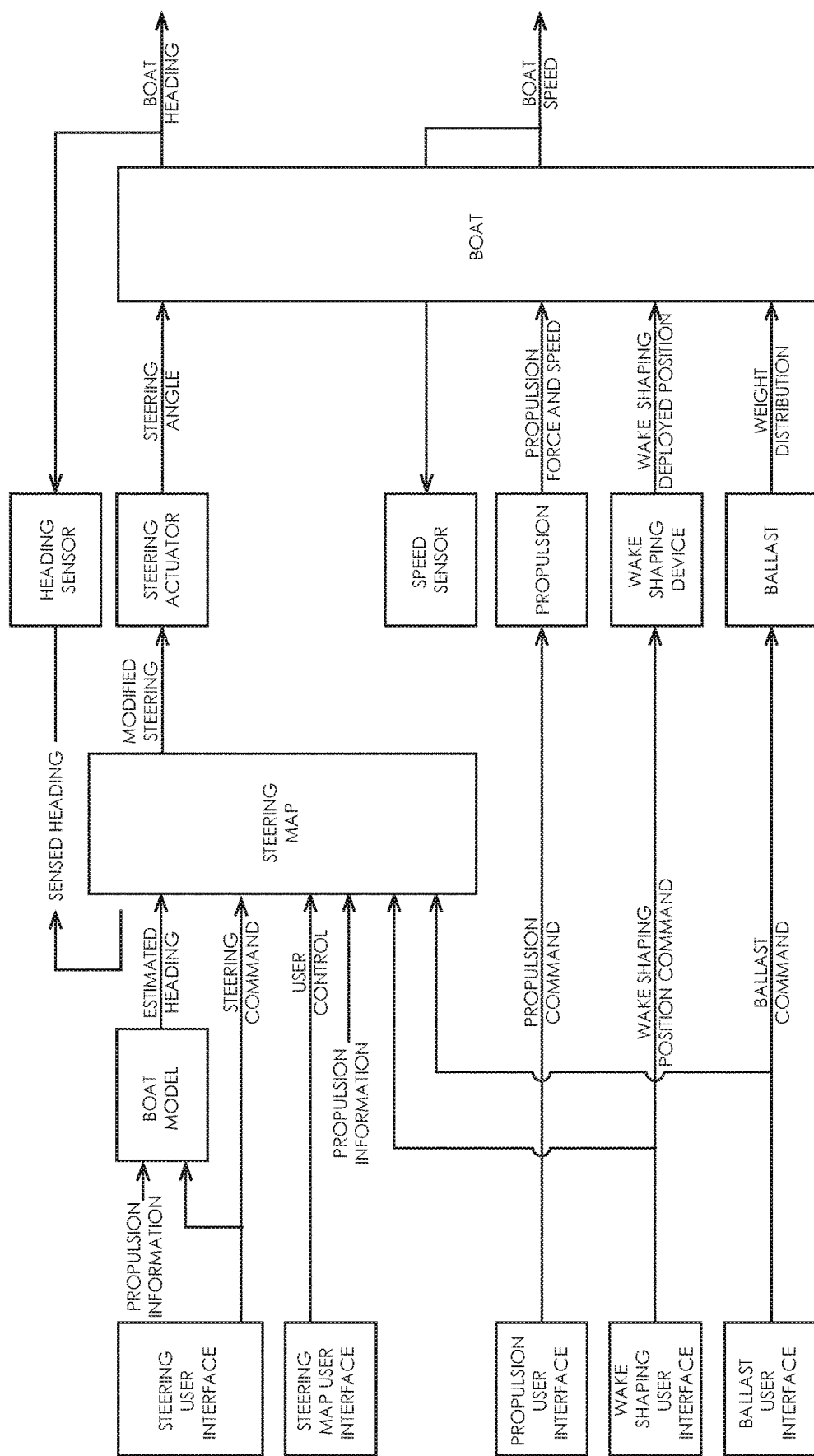
FIG. 19 is an exemplar logic diagram showing an overall logic of a system for actuating a first structural element of a marine vessel and a second structural element of a marine vessel using a single operator command.

FIG. 18 is a logic diagram showing a logic of deploying at least one of the port wake gate and the starboard wake gate based on a steering command, RPM, and/or speed. An operator inputs an operator command to deploy the port wake gate 114 and the starboard wake gate 116 to bias the wake to one side of the marine vessel 110 and apply a steering command based on the vessel speed and wave shaping actuator position, to control the steering actuator to compensate for the undesirable steering effect. In this case, a steering wheel provides a target rate of change of heading instead of traditional target rudder position. It is optional that the boat heading or turn rate in general is further closed loop controlled by the controller with a feedback signal from a heading sensor. FIG. 19 shows an overall logic of the system. Different shapes of wake gates with either electrical or hydraulic actuators are commonly used for towable boats, for example, one type uses a pivoting gate with a hydraulic actuator and another type uses a linearly expendable blade, similar to an interceptor, with an electric actuator. The controller presented here applies to these systems.

It will be understood by a person skilled in the art that many of the details provided above are by way of example only, and are not intended to limit the scope of the invention which is to be determined with reference to the following claims.

What is claimed is:

1. A method of controlling a marine vessel, the method comprising:
   identifying at least a target turn rate of the marine vessel in response to at least an operator command;
   controlling a position, relative to a hull of the marine vessel, of at least one structural element of the marine vessel in response to at least the target turn rate, the at least one structural element controlling at least a direction of motion of the marine vessel; and identifying a target position, relative to the marine vessel, of the at least one structural element, wherein:
identifying the target position comprises identifying the target position as a position of the at least one structural element, relative to the marine vessel, that causes the marine vessel to turn at the target turn rate; and
controlling the position of the at least one structural element comprises causing the at least one structural element to move to the target position relative to the marine vessel.

2. The method of claim 1 wherein the at least one structural element comprises at least one steering actuator.

3. The method of claim 2 wherein controlling the position of the at least one structural element comprises causing the at least one steering actuator to change a steering angle of at least one propulsion unit of the marine vessel.

4. The method of claim 2 wherein controlling the position of the at least one structural element comprises causing the at least one steering actuator to change a steering angle of at least one rudder of the marine vessel.

5. The method of claim 1 wherein controlling the position of the at least one structural element comprises causing at least one actuator to move at least one trim tab of the marine vessel.

6. The method of claim 1 wherein controlling the position of the at least one structural element comprises causing at least one actuator to move at least one wake gate of the marine vessel.

7. The method of claim 1 wherein the operator command indicates at least a steering position of a steering wheel of the marine vessel.

8. The method of claim 1 wherein controlling the position of the at least one structural element comprises controlling the position of the at least one structural element in response to at least closed-loop control with feedback from a heading sensor of the marine vessel.

9. The method of claim 1 wherein the target turn rate is a target rate of change of heading of the marine vessel.

10. A system for controlling a marine vessel, the system comprising:
a controller configured to, at least:
identify at least a target turn rate of the marine vessel in response to at least an operator command; and
control a position, relative to a hull of the marine vessel, of at least one structural element in response to at least the target turn rate;
wherein the controller is further configured to, at least, identify a target position, relative to the marine vessel, of the at least one structural element, wherein:
the controller is configured to identify the target position by, at least, identifying the target position as a position of the at least one structural element, relative to the marine vessel, that causes the marine vessel to turn at the target turn rate; and
the controller is configured to control the position of the at least one structural element by, at least, causing the at least one structural element to move to the target position relative to the marine vessel.

11. The system of claim 10 further comprising the at least one structural element in communication with the controller, wherein the at least one structural element is configured to control at least a direction of motion of the marine vessel.

12. The system of claim 11 wherein the at least one structural element comprises at least one steering actuator configured to change a steering angle of at least one propulsion unit of the marine vessel.

13. The system of claim 11 wherein the at least one structural element comprises at least one steering actuator configured to change a steering angle of at least one rudder of the marine vessel.

14. The system of claim 11 wherein the at least one structural element comprises at least one actuator configured to move at least one trim tab of the marine vessel to control at least direction of motion of the marine vessel.

15. The system of claim 11 wherein the at least one structural element comprises at least one actuator configured to move at least one wake gate of the marine vessel to control at least direction of motion of the marine vessel.

16. The system of claim 10 further comprising a steering wheel in communication with the controller, wherein the at least one operator command indicates at least a steering position of the steering wheel.

17. The system of claim 10 further comprising a heading sensor in communication with the controller, wherein the controller is configured to control the position of the at least one structural element at least in response to closed-loop control with feedback from the heading sensor.

18. The system of claim 10 wherein the target turn rate is a target rate of change of heading of the marine vessel.

19. The method of claim 1 wherein the operator command indicates at least the target turn rate.

20. The system of claim 10 wherein the operator command indicates at least the target turn rate.

* * * * *